US012763004B2

(12) United States Patent
Yoo et al.

(10) Patent No.: US 12,763,004 B2
(45) Date of Patent: Oct. 13, 2026

(54) DISPLAY DEVICE FOR REDUCING AFTERIMAGE, METHOD OF OPERATING THE DISPLAY DEVICE AND ELECTRONIC DEVICE INCLUDING THE DISPLAY DEVICE

(71) Applicant: Samsung Display Co., Ltd., Yongin-si (KR)

(72) Inventors: Gi-Na Yoo, Yongin-si (KR); Hyomin Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/175,827

(22) Filed: Apr. 10, 2025

(65) Prior Publication Data

US 2026/0024486 A1 Jan. 22, 2026

(30) Foreign Application Priority Data

Jul. 18, 2024 (KR) ........................ 10-2024-0094921

(51) Int. Cl.
*G09G 3/32* (2016.01)

(52) U.S. Cl.
CPC ....... *G09G 3/32* (2013.01); *G09G 2310/0275* (2013.01); *G09G 2320/0257* (2013.01); *G09G 2330/021* (2013.01); *G09G 2360/16* (2013.01)

(58) Field of Classification Search
CPC ............. G09G 3/32; G09G 2310/0275; G09G 2320/0257; G09G 2330/021; G09G 2360/16
See application file for complete search history.

(56) References Cited

U.S. PATENT DOCUMENTS

| | | | | |
|---|---|---|---|---|
| 7,675,492 | B2 | 3/2010 | Park et al. | |
| 2022/0139309 | A1* | 5/2022 | Ok ....................... | G09G 3/3225 345/214 |

FOREIGN PATENT DOCUMENTS

| | | | |
|---|---|---|---|
| KR | 10-2067421 | B1 | 1/2020 |
| KR | 10-2021-0020787 | A | 2/2021 |
| KR | 10-2021-0020791 | A | 2/2021 |
| KR | 10-2021-0085200 | A | 7/2021 |
| KR | 10-2022-0060219 | A | 5/2022 |

* cited by examiner

*Primary Examiner* — David D Davis

(74) *Attorney, Agent, or Firm* — Womble Bond Dickinson (US) LLP

(57) ABSTRACT

A display device includes a driving controller configured to receive input image data, and generate output image data, a data driver configured to generate data voltages based on the output image data, and a display panel configured to display an image based on the data voltages. The driving controller is further configured to divide the display panel into pixel blocks, divide each of the pixel blocks into sub-pixel blocks, calculate degradation data of each of the sub-pixel blocks, and generate the output image data based on the degradation data and the input image data. The sub-pixel blocks of a first pixel block of the pixel blocks have different shapes from each other.

20 Claims, 23 Drawing Sheets

DISPLAY DEVICE FOR REDUCING AFTERIMAGE, METHOD OF OPERATING THE DISPLAY DEVICE AND ELECTRONIC DEVICE INCLUDING THE DISPLAY DEVICE

CROSS-REFERENCE TO RELATED APPLICATION

The present application claims priority to and the benefit of Korean Patent Application No. 10-2024-0094921, filed on Jul. 18, 2024, in the Korean Intellectual Property Office, the entire disclosure of which is incorporated by reference herein.

BACKGROUND

1. Field

Aspects of embodiments of the present disclosure relate to a display device, a method of operating the display device, and an electronic device including the display device.

2. Description of the Related Art

As an operating time of a display device, such as an organic light emitting display device, accumulates, light emitting elements (e.g. an organic light emitting diode (OLED)) of pixels included in the display device may be degraded.

The above information disclosed in this Background section is for enhancement of understanding of the background of the present disclosure, and therefore, it may contain information that does not constitute prior art.

SUMMARY

When the pixels are degraded, an afterimage may be visible in a display panel of a display device. Therefore, the display device may divide the display panel into blocks, may accumulate degradation data for each of the blocks, and may compensate input image data based on the degradation data. Compensation values for respective blocks may be different from each other. Further, when each of the blocks has the same rectangular shape as each other, a length of a boundary between adjacent blocks among the blocks may be increased. A difference in a luminance of each of the blocks may be easily visible. In other words, the afterimage may be visible in the display panel, and thus, a display quality of the display device may be decreased. In addition, a size of the blocks may be decreased in order to prevent or substantially prevent the afterimage. However, the number of the blocks may be increased as the length of the boundary between the adjacent blocks decreases. When the number of the blocks increases, a memory capacity and a power consumption of the display device may increase.

One or more embodiments of the present disclosure may be directed to a display device having an improved display quality and a reduced power consumption.

One or more embodiments of the present disclosure may be directed to a method of operating the display device.

One or more embodiments of the present disclosure may be directed to an electronic device including the display device.

According to one or more embodiments of the present disclosure, a display device includes: a driving controller configured to receive input image data, and generate output image data; a data driver configured to generate data voltages based on the output image data; and a display panel configured to display an image based on the data voltages. The driving controller is further configured to: divide the display panel into pixel blocks; divide each of the pixel blocks into sub-pixel blocks; calculate degradation data of each of the sub-pixel blocks; and generate the output image data based on the degradation data and the input image data. The sub-pixel blocks of a first pixel block of the pixel blocks have different shapes from each other.

In an embodiment, each of the sub-pixel blocks of the first pixel block may have N outlines, where N may be an integer greater than or equal to 5, and the sub-pixel blocks of the first pixel block may be symmetrical to each other.

In an embodiment, the sub-pixel blocks may include: first sub-pixel blocks, each having N outlines, where N is an integer greater than or equal to 5; and second sub-pixel blocks, each having four outlines, and having a same shape as each other. The first sub-pixel blocks may be symmetrical to each other.

In an embodiment, the first pixel block may include the first sub-pixel blocks, and a second pixel block of the pixel blocks may include the second sub-pixel blocks.

In an embodiment, the sub-pixel blocks of the first pixel block may include: first sub-pixel blocks, each having N outlines, and having a same shape as each other, where N is an integer greater than or equal to 5; and second sub-pixel blocks, each having M outlines, where M is an integer greater than or equal to 5. The second sub-pixel blocks may be symmetrical to each other.

In an embodiment, the sub-pixel blocks may include: first sub-pixel blocks, each having N outlines, and having a same shape as each other, where N is an integer greater than or equal to 5; second sub-pixel blocks, each having M outlines, where M is an integer greater than or equal to 5; and third sub-pixel blocks, each having four outlines, and having a same shape as each other. The second sub-pixel blocks may be symmetrical to each other.

In an embodiment, the first pixel block may include the first sub-pixel blocks and the second sub-pixel blocks, and a second pixel block of the pixel blocks may include the third sub-pixel blocks.

In an embodiment, the sub-pixel blocks may include: first sub-pixel blocks, each having N outlines, where N is an integer greater than or equal to 5; and second sub-pixel blocks, each having M outlines, where M is an integer greater than or equal to 5. The first sub-pixel blocks may be symmetrical to each other, and the second sub-pixel blocks may be symmetrical to each other.

In an embodiment, the first pixel block may include the first sub-pixel blocks, and a second pixel block of the pixel blocks may include the second sub-pixel blocks.

In an embodiment, the sub-pixel blocks may include: first sub-pixel blocks, each having N outlines, where N is an integer greater than or equal to 5; second sub-pixel blocks, each having M outlines, where M is an integer greater than or equal to 5; and third sub-pixel blocks, each having four outlines, and having a same shape as each other. The first sub-pixel blocks may be symmetrical to each other, and the second sub-pixel blocks may be symmetrical to each other.

In an embodiment, the first pixel block may include the first sub-pixel blocks, a second pixel block of the pixel blocks may include the second sub-pixel blocks, and a third pixel block of the pixel blocks may include the third sub-pixel blocks.

In an embodiment, the sub-pixel blocks may include: first sub-pixel blocks, each having N outlines, where N is an integer greater than or equal to 5; second sub-pixel blocks, each having M outlines, where M is an integer greater than or equal to 5; and third sub-pixel blocks, each having K outlines, and having a same shape as each other, where K is an integer greater than or equal to 5. The first sub-pixel blocks may be symmetrical to each other, and the second sub-pixel blocks may be symmetrical to each other.

In an embodiment, the first pixel block may include the first sub-pixel blocks, and a second pixel block of the pixel blocks may include the second sub-pixel blocks and the third sub-pixel blocks.

In an embodiment, the first pixel block may include the first sub-pixel blocks, a second pixel block of the pixel blocks may include the second sub-pixel blocks, and a third pixel block of the pixel blocks may include the second sub-pixel blocks and the third sub-pixel blocks.

In an embodiment, the sub-pixel blocks may include: first sub-pixel blocks, each having N outlines, where N is an integer greater than or equal to 5; second sub-pixel blocks, each having M outlines, where M is an integer greater than or equal to 5; third sub-pixel blocks, each having K outlines, and having a same shape as each other, where K is an integer greater than or equal to 5; and fourth sub-pixel blocks, each having four outlines, and having a same shape as each other. The first sub-pixel blocks may be symmetrical to each other, and the second sub-pixel blocks may be symmetrical to each other.

In an embodiment, the first pixel block may include the first sub-pixel blocks, a second pixel block of the pixel blocks may include the second sub-pixel blocks and the third sub-pixel blocks, and a third pixel block of the pixel blocks may include the fourth sub-pixel blocks.

In an embodiment, the first pixel block may include the first sub-pixel blocks, a second pixel block of the pixel blocks may include the second sub-pixel blocks, a third pixel block of the pixel blocks may include the second sub-pixel blocks and third sub-pixel blocks, and a fourth pixel block of the pixel blocks may include the fourth sub-pixel blocks.

According to one or more embodiments of the present disclosure, a method of operating a display device, includes: dividing a display panel into pixel blocks; dividing each of the pixel blocks into sub-pixel blocks; calculating degradation data of each of the sub-pixel blocks; and generating output image data based on the degradation data and input image data. The sub-pixel blocks of a first pixel block of the pixel blocks have different shapes from each other.

According to one or more embodiments of the present disclosure, an electronic device includes: a processor configured to generate input image data; a driving controller configured to receive the input image data, and generate output image data; a data driver configured to generate data voltages based on the output image data; and a display panel configured to display an image based on the data voltages. The driving controller is further configured to: divide the display panel into pixel blocks; divide each of the pixel blocks into sub-pixel blocks; calculate degradation data of each of the sub-pixel blocks; and generate the output image data based on the degradation data and the input image data. The sub-pixel blocks of a first pixel block of the pixel blocks have different shapes from each other.

In an embodiment, each of the sub-pixel blocks of the first pixel block may have N outlines, where N may be an integer greater than or equal to 5, and the sub-pixel blocks of the first pixel block may be symmetrical to each other.

According to some embodiments of the present disclosure, in the display device, the method of operating the display device, and the electronic device including the display device, the display device may divide the display panel into pixel blocks. The display device may divide the pixel blocks into sub-pixel blocks. The display device may determine a shape of each of the sub-pixel blocks to be non-rectangular. When a luminance difference occurs between adjacent sub-pixel blocks among the sub-pixel blocks, a length of boundaries may be decreased, and an area where the luminance difference may be visible may be decreased. The area where the luminance difference may be visible may be decreased, so that an afterimage may be not visible.

According to some embodiments of the present disclosure, the shape of each of the sub-pixel blocks may be changed, but the number of the pixels included in each of the sub-pixel blocks may be the same as that of a comparative display device. The memory capacity for storing the degradation data of each of the sub-pixel blocks may be the same as that of the comparative display device. In other words, the number of the pixels included in the sub-pixel blocks may be decreased, so that the memory capacity may be decreased when compared to that of a reducing of the length of the boundaries of the sub-pixel blocks. When the memory capacity decreases, the power consumption of the display device may be decreased.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
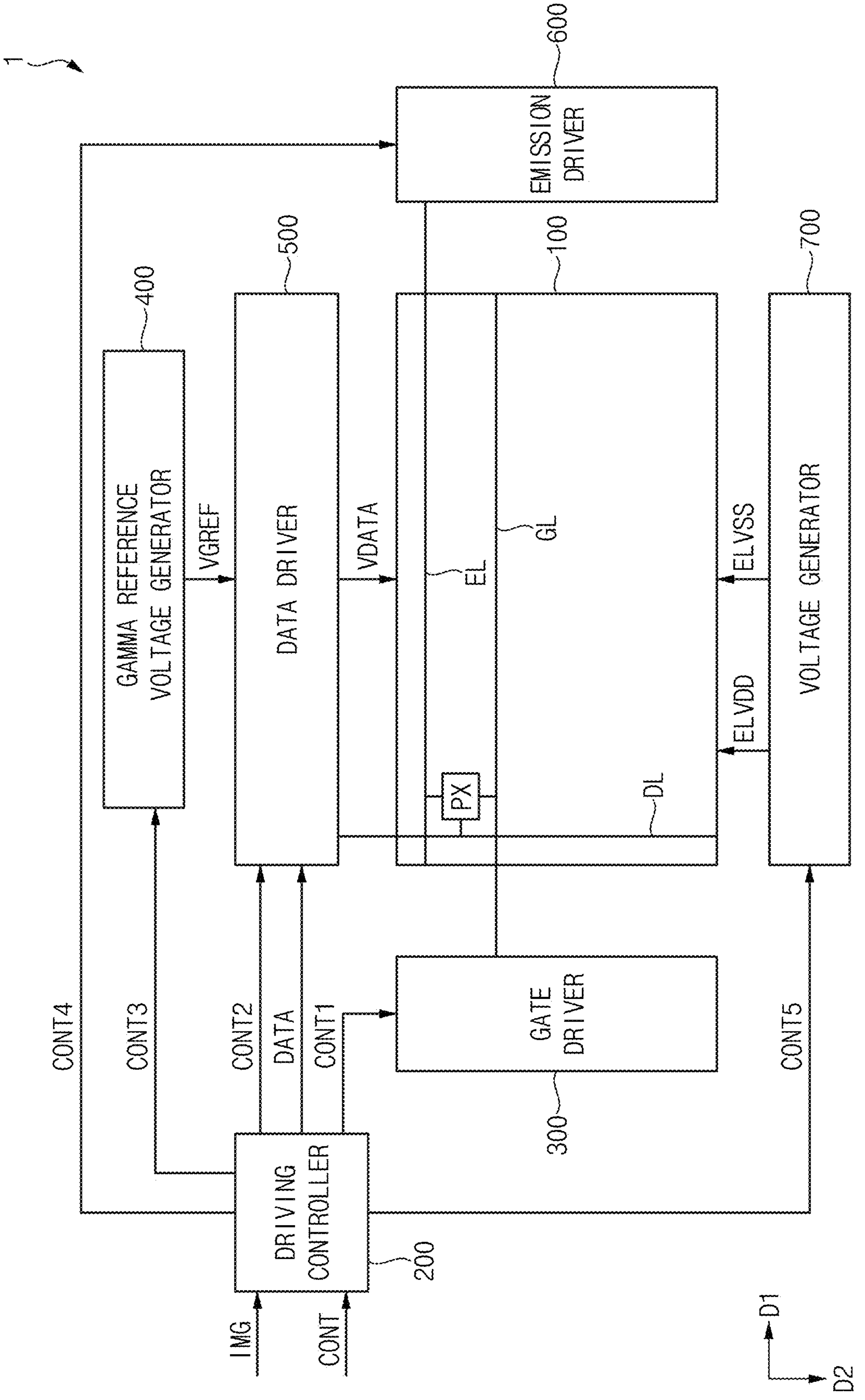
FIG. 1 is a block diagram illustrating a display device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device 1 according to an embodiment of the present disclosure.

Referring to FIG. 1, the display device 1 may include a display panel 100 and a display panel driver. The display panel driver may include a driving controller 200, a gate driver 300, a gamma reference voltage generator 400, and a data driver 500. In an embodiment, the display device 1 may include an emission driver 600 and a voltage generator 700.

The display panel 100 may have a display region on which an image is displayed, and a peripheral region adjacent to the display region.

The display panel 100 may include gate lines GL, data lines DL, emission lines EL, and pixels PX. The pixels PX may be electrically connected to the gate lines GL, the data lines DL, and the emission lines EL. The gate lines GL may extend in a first direction D1, the data lines DL may extend in a second direction D2 crossing the first direction D1, and the emission lines EL may extend in the first direction D1.

The driving controller 200 may receive input image data IMG and an input control signal CONT from an external device. For example, the input image data IMG may include red image data, green image data, and blue image data. The input image data IMG may further include white image data according to an embodiment. In another example, the input image data IMG may include magenta image data, cyan image data, and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, and output image data DATA, based on the input image data IMG and the input control signal CONT. In an embodiment, the driving controller 200 may further generate a fourth control signal CONT4 and a fifth control signal CONT5.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may accumulate a plurality of degradation data for the display panel 100. The driving controller 200 may generate the output image data DATA based on the accumulated degradation data and the input image data IMG.

The driving controller 200 may generate the output image data DATA based on the input image data IMG. The driving controller 200 may output the output image data DATA to the data driver 500.

The driving controller 200 may generate the third control signal CONT3 for controlling an operation of the gamma reference voltage generator 400 based on the input control signal CONT, and may output the third control signal CONT3 to the gamma reference voltage generator 400.

In an embodiment, the driving controller 200 may generate the fourth control signal CONT4 for controlling an operation of the emission driver 600 based on the input control signal CONT, and may output the fourth control signal CONT4 to the emission driver 600.

In an embodiment, the driving controller 200 may generate the fifth control signal CONT5 for controlling an operation of the voltage generator 700 based on the input control signal CONT, and may output the fifth control signal CONT5 to the voltage generator 700.

The gate driver 300 may generate gate signals for driving the gate lines GL in response to the first control signal CONT1 received from the driving controller 200. The gate driver 300 may output the gate signals to the gate lines GL. In an embodiment, the gate signals may include a writing gate signal, a compensation gate signal, an initialization gate signal, and a bias gate signal.

In an embodiment, the gate driver 300 may be integrated in the peripheral region of the display panel 100. In an embodiment, the gate driver 300 may be mounted on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to the output image data DATA.

For example, the gamma reference voltage generator 400 may be disposed in the driving controller 200, or may be disposed in the data driver 500.

The data driver 500 may receive the second control signal CONT2 and the output image data DATA from the driving controller 200, and may receive the gamma reference voltages VGREF from the gamma reference voltage generator 400. The data driver 500 may convert the output image data DATA into data voltages VDATA having an analog kind by using the gamma reference voltages VGREF. The data driver 500 may output the data voltages VDATA to the data lines DL.

In an embodiment, the data driver 500 may be integrated in the peripheral region of the display panel 100. In an embodiment, the data driver 500 may be mounted on the peripheral region of the display panel 100.

In an embodiment, the emission driver 600 may generate emission signals to drive the emission lines EL in response to the fourth control signal CONT4 received from the driving controller 200. The emission driver 600 may output the emission signals to the emission lines EL.

In an embodiment, the emission driver 600 may be integrated in the peripheral region of the display panel 100. In an embodiment, the emission driver 600 may be mounted on the peripheral region of the display panel 100.

Although FIG. 1 illustrates, for convenience of illustration, that the gate driver 300 is disposed at a first side of the display panel 100 and the emission driver 600 is disposed at a second side of the display panel 100 opposite to the first side, the present disclosure is not limited thereto. For example, both of the gate driver 300 and the emission driver 600 may be disposed at the first side of the display panel 100. For example, both of the gate driver 300 and the emission driver 600 may be disposed at both the first and second sides of the display panel 100. For example, the gate driver 300 and the emission driver 600 may be integrally formed with each other.

In an embodiment, the voltage generator 700 may generate a first power supply voltage ELVDD and a second power supply voltage ELVSS, in response to the fifth control signal CONT5 received from the driving controller 200. The voltage generator 700 may output the first power supply voltage ELVDD and the second power supply voltage ELVSS to the display panel 100.

Figure 2:
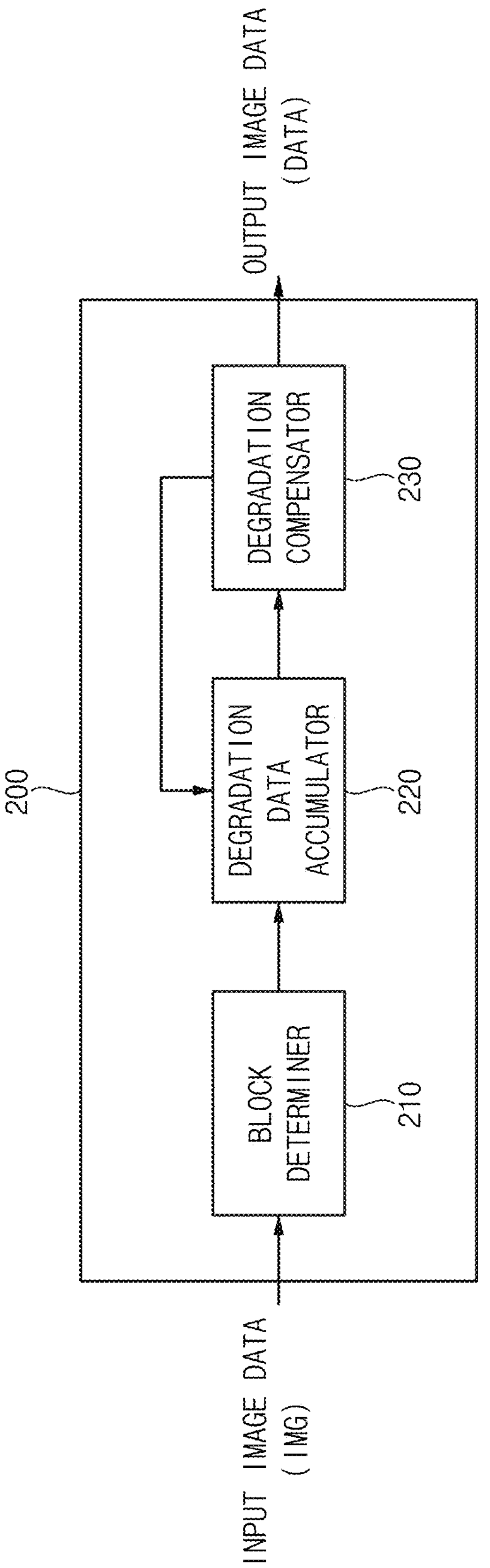
FIG. 2 is a block diagram illustrating a driving controller of the display device of FIG. 1.

FIG. 2 is a block diagram illustrating the driving controller 200 of the display device 1 of FIG. 1.

Referring to FIG. 2, the driving controller 200 may include a block determiner 210, a degradation data accumulator 220, and a degradation compensator 230.

The block determiner 210 may divide the display panel 100 into pixel blocks. The block determiner 210 may divide each of the pixel blocks into sub-pixel blocks. In this case, the sub-pixel blocks of a first pixel block of the pixel blocks may have different shapes from each other.

The degradation data accumulator 220 may calculate degradation data of each of the sub-pixel blocks based on output image data DATA. For example, the degradation data accumulator 220 may accumulate the degradation data of each of the sub-pixel blocks based on the output image data DATA.

The degradation compensator 230 may generate the output image data DATA based on the degradation data of each of the sub-pixel blocks and input image data IMG, and may output the output image data DATA to the data driver 500.

The display device 1 may determine a shape of each of the sub-pixels to be non-rectangular. When the shape of the sub-pixel blocks is not rectangular, a length of boundaries between adjacent sub-pixel blocks among the sub-pixel blocks may be decreased. When a luminance difference occurs between adjacent sub-pixel blocks among the sub-pixel blocks, the length of the boundaries may be decreased, and a length of an area where the luminance difference may be visible may be decreased. The length of the area where the luminance difference may be visible may be decreased, so that an afterimage may be not visible.

In addition, the shape of each of the sub-pixel blocks may be changed, but the number of the pixels included in each of the sub-pixel blocks may be the same as that in a comparative display device. A memory capacity for storing the degradation data of each of the sub-pixel blocks may be the same as that in the comparative display device. In other words, the number of the pixels PX included in the sub-pixel blocks may be decreased, so that the memory capacity may be decreased when compared to reducing the length of the boundaries of the sub-pixel blocks. When the memory capacity decreases, a power consumption of the display device 1 may be decreased.

Figure 3:
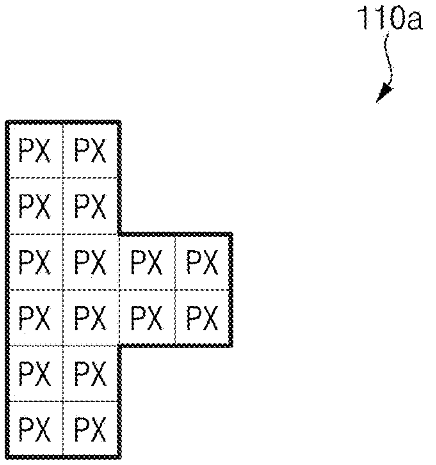
FIG. 3 is a diagram illustrating an example of a sub-pixel block dividing a display panel of the display device of FIG. 1.

FIG. 3 is a diagram illustrating an example of a sub-pixel block 110*a* dividing the display panel 100 of the display device 1 of FIG. 1.

Referring to FIG. 3, the first sub-pixel block 110*a* of the sub-pixel blocks may include N outlines (e.g., N sides), where N is an integer greater than or equal to 5. For example, the first sub-pixel block 110*a* may include eight outlines (e.g., eight sides).

The first sub-pixel block 110*a* may include the pixels PX. For example, the first sub-pixel block 110*a* may include sixteen pixels PX. The first sub-pixel block 110*a* may include two pixels PX in each of a first row, a second row, a fifth row, and a sixth row. The first sub-pixel block 110*a* may include four columns. Each of a first column and a second column may include six pixels PX. Each of a third column and a fourth column may include two pixels PX.

The display device 1 may determine the shape of each of the sub-pixel blocks to be non-rectangular. When the shape of each of the sub-pixel blocks is not rectangular, the length of the boundaries between adjacent sub-pixel blocks among the sub-pixel blocks may be decreased. When a luminance difference occurs between the adjacent sub-pixel blocks among the sub-pixel blocks, the length of the boundaries may be decreased, and the length of an area where the luminance difference may be visible may be decreased. The length of the area where the luminance difference may be visible may be decreased, so that the afterimage may be not be visible.

In addition, the shape of each of the sub-pixel blocks may be changed, but the number of the pixels included in each of the sub-pixel blocks may be the same as that in the comparative display device. The memory capacity for storing the degradation data of each of the sub-pixel blocks may be the same as that in the comparative display device. In other words, the number of the pixels PX included in the sub-pixel blocks may be decreased, so that the memory capacity may be decreased compared to that of a reducing of the length of the boundaries of the sub-pixel blocks. When the memory capacity decreases, the power consumption of the display device 1 may be decreased.

Figure 4:
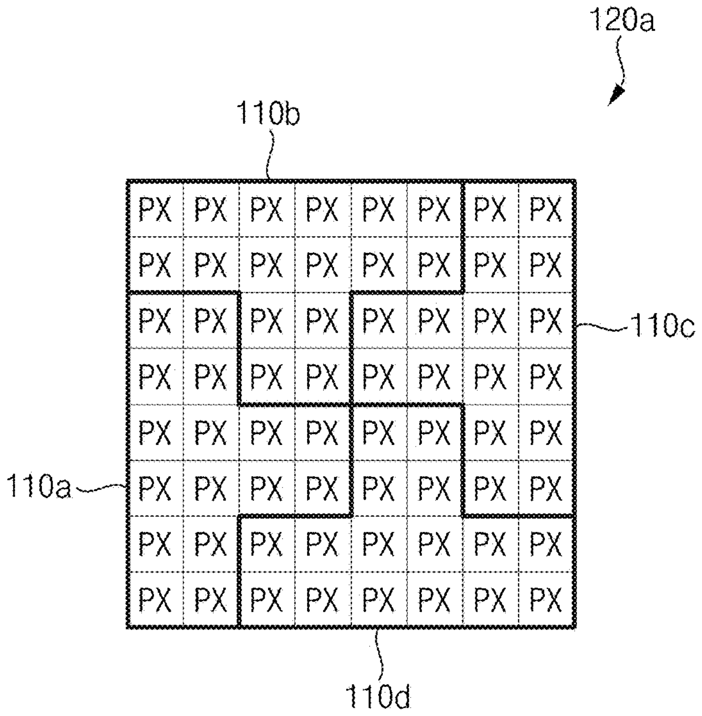
FIG. 4 is a diagram illustrating an example of a pixel block dividing a display panel of the display device of FIG. 1.

FIG. 4 is a diagram illustrating an example of a pixel block 120*a* dividing the display panel 100 of the display device 1 of FIG. 1.

Referring to FIG. 4, the display panel 100 may be divided into a plurality of pixel blocks. At least one pixel block among the pixel blocks may include pixels PX, and may be divided into the sub-pixel blocks, in which at least two of the sub-pixel blocks have the different shapes.

In an embodiment, the first pixel block 120*a* of the pixel blocks may divided into the first sub-pixel block 110*a* (e.g., see FIG. 3), a second sub-pixel block 110*b*, a third sub-pixel block 110*c*, and a fourth sub-pixel block 110*d*. Each of the second sub-pixel block 110*b*, the third sub-pixel block 110*c*, and the fourth sub-pixel block 110*d* may be symmetrical or substantially symmetrical to the first sub-pixel block 110*a*.

When the first pixel block 120*a* is divided into the first sub-pixel block 110*a*, the second sub-pixel block 110*b*, the third sub-pixel block 110*c*, and the fourth sub-pixel block 110*d*, a length of an adjacent boundary of each of the first sub-pixel block 110*a*, the second sub-pixel block 110*b*, the third sub-pixel block 110*c*, and the fourth sub-pixel block 110*d* may be equal to or substantially equal to a length of the two pixels PX. In other words, the length of the boundary of the sub-pixel blocks may be shorter than a length of a comparative boundary. Accordingly, even if a difference of each of the sub-pixels blocks occurs, the length of the boundary may be decreased, so that the afterimage may not be visible.

The number of the pixels PX included in the first sub-pixel block 110*a*, the second sub-pixel block 110*b*, the third sub-pixel block 110*c*, and the fourth sub-pixel block 110*d* may be equal to or substantially equal to the number of pixels included in comparative sub-pixel blocks. For example, each of the comparative sub-pixel blocks may include sixteen pixels, and each of the first sub-pixel block 110*a*, the second sub-pixel block 110*b*, the third sub-pixel block 110*c*, and the fourth sub-pixel block 110*d* may include sixteen pixels PX. In other words, the memory capacity may be decreased compared to that of a case of reducing the number of the pixels PX included in the first sub-pixel block 110*a*, the second sub-pixel block 110*b*, the third sub-pixel block 110*c*, and the fourth sub-pixel block 110*d*, and reducing the length of the boundary of each of the first sub-pixel block 110*a*, the second sub-pixel block 110*b*, the third sub-pixel block 110*c*, and the fourth sub-pixel block 110*d*. When the memory capacity decreases, the power consumption of the display device 1 may be decreased.

Figure 5:
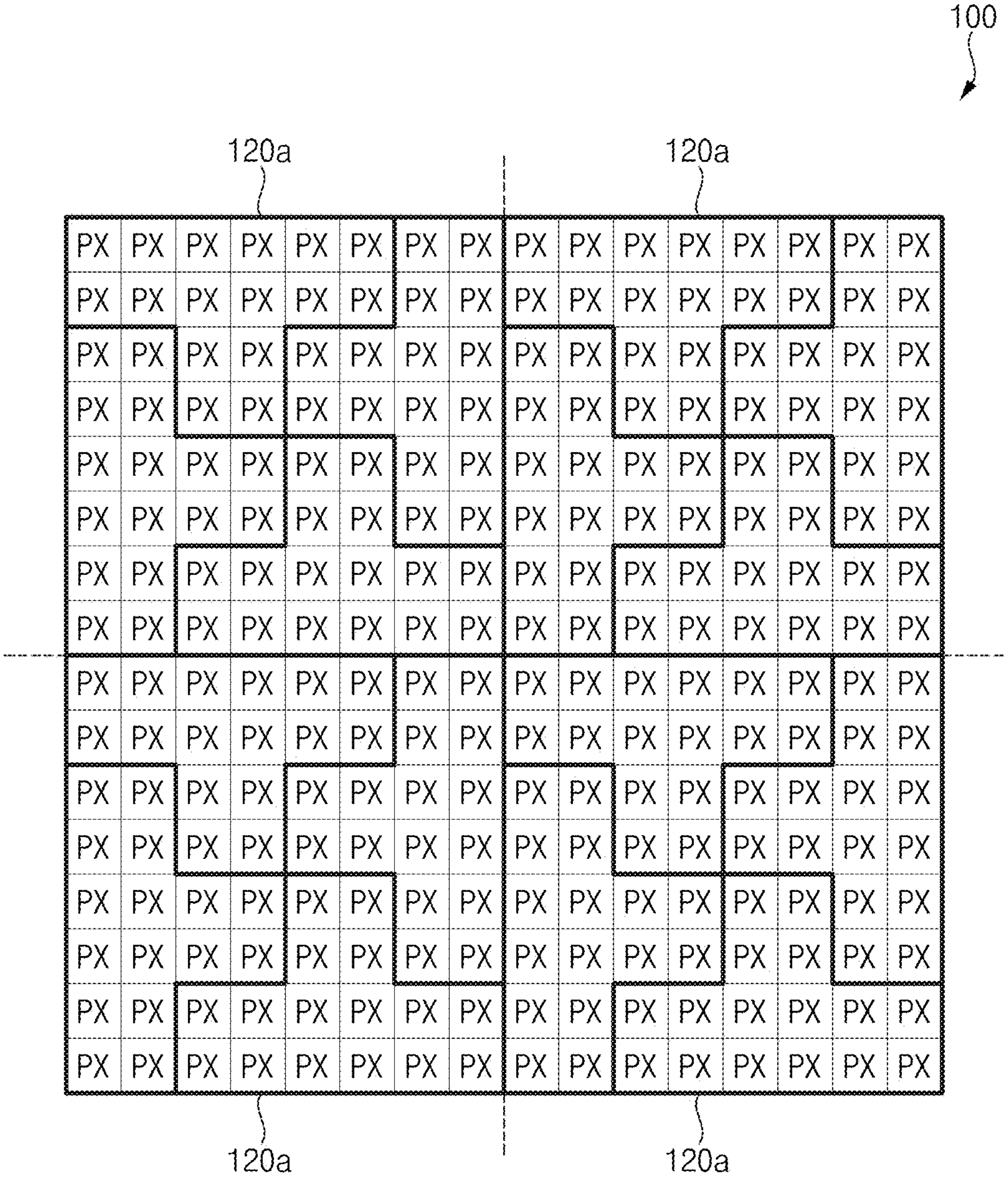
FIG. 5 is a diagram illustrating an example of a display panel of the display device of FIG. 1.

FIG. 5 is a diagram illustrating an example of the display panel 100 of the display device of FIG. 1.

Referring to FIG. 5, the display panel 100 may be divided into a plurality of pixel blocks.

In an embodiment, the display panel 100 may be divided into a plurality of the first pixel blocks 120*a*. Each of the first pixel blocks 120*a* may be divided into the first sub-pixel block 110*a*, the second sub-pixel block 110*b*, the third sub-pixel block 110*c*, and the fourth sub-pixel block 110*d* (e.g., see FIG. 4).

When the first pixel block 120*a* is divided into the first sub-pixel block 110*a*, the second sub-pixel block 110*b*, the third sub-pixel block 110*c*, and the fourth sub-pixel block 110*d*, the length of an adjacent boundary of each of the first sub-pixel block 110*a*, the second sub-pixel block 110*b*, the third sub-pixel block 110*c*, and the fourth sub-pixel block 110*d* may be equal to or substantially equal to the length of two pixels PX. In other words, the length of the boundary of each of the sub-pixel blocks may be shorter than the length of the comparative boundary. Accordingly, even if a difference of each of the sub-pixels blocks occurs, the length of the boundary may be decreased, so that the afterimage may not be visible. When the display panel 100 is divided into the pixel blocks having the shape of those of the first pixel blocks 120*a*, the afterimage may not be visible in the display panel 100.

The number of the pixels PX included in the first sub-pixel block 110*a*, the second sub-pixel block 110*b*, the third sub-pixel block 110*c*, and the fourth sub-pixel block 110*d* may be equal to or substantially equal to the number of pixels included in comparative sub-pixel blocks. For example, each of the comparative sub-pixel blocks may include sixteen pixels, and each of the first sub-pixel block 110*a*, the second sub-pixel block 110*b*, the third sub-pixel block 110*c*, and the fourth sub-pixel block 110*d* may include sixteen pixels PX. In other words, the memory capacity may be decreased compared to that of a case of reducing the number of the pixels PX included in the first sub-pixel block 110*a*, the second sub-pixel block 110*b*, the third sub-pixel block 110*c*, and the fourth sub-pixel block 110*d*, and reducing the length of the boundary of each of the first sub-pixel block 110*a*, the second sub-pixel block 110*b*, the third sub-pixel block 110*c*, and the fourth sub-pixel block 110*d*. When the memory capacity decreases, the power consumption of the display device 1 may be decreased.

Figure 6:
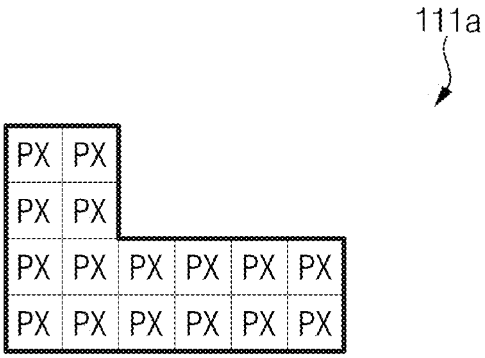
FIG. 6 is a diagram illustrating an example of a sub-pixel block dividing a display panel of the display device of FIG. 1.
Figure 7:
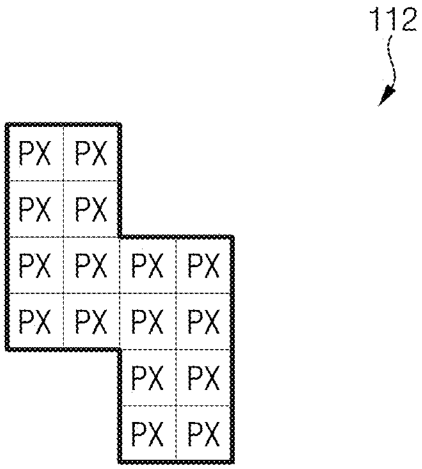
FIG. 7 is a diagram illustrating an example of a sub-pixel block dividing a display panel of the display device of FIG. 1.
Figure 8:
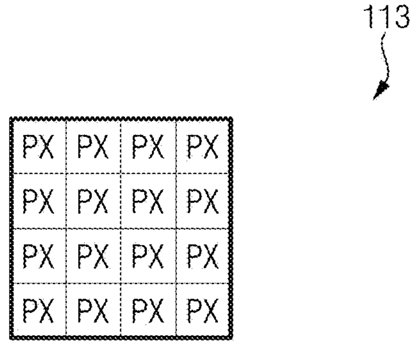
FIG. 8 is a diagram illustrating an example of a sub-pixel block dividing a display panel of the display device of FIG. 1.

FIG. 6 is a diagram illustrating an example of a sub-pixel block 111*a* dividing the display panel 100 of the display device 1 of FIG. 1. FIG. 7 is a diagram illustrating an example of a sub-pixel block 112 dividing the display panel 100 of the display device 1 of FIG. 1. FIG. 8 is a diagram illustrating an example of a sub-pixel block 113 dividing the display panel 100 of the display device 1 of FIG. 1.

Referring to FIG. 6, a fifth sub-pixel block 111*a* among the sub-pixel blocks may include M outlines (e.g., M sides), where M is an integer greater than or equal to 5. For example, the fifth sub-pixel block 111*a* may include six outlines (e.g., six sides).

The fifth sub-pixel block 111*a* may include pixels PX. For example, the fifth sub-pixel block 111*a* may include sixteen pixels PX. For example, the fifth sub-pixel block 111*a* may include four rows. Each of a first row and a second row of the fifth sub-pixel block 111*a* may include two pixels PX. Each of a third row and a fourth row of the fifth sub-pixel block 111*a* may include six pixels PX. The fifth sub-pixel block 111*a* may include six columns. Each of a first column and a second column may include four pixels PX. Each of a third column, a fourth column, a fifth column, and a sixth column may include two pixels PX.

Referring to FIG. 7, a sixth sub-pixel block 112 among the sub-pixel blocks may include K outlines (e.g., K sides), where K is an integer greater than or equal to 5. For example, the sixth sub-pixel block 112 may include eight outlines (e.g., eight sides).

The sixth sub-pixel block 112 may include pixels PX. For example, the sixth sub-pixel block 112 may include sixteen pixels PX. For example, the sixth sub-pixel block 112 may include six rows. Each of a first row, a second row, a fifth row, and a sixth row of the sixth sub-pixel block 112 may include two pixels PX. Each of a third row and a fourth row of the sixth sub-pixel block 112 may include four pixels PX. The sixth sub-pixel block 112 may include four columns. Each of a first column and a second column may include four pixels PX. Each of a third column and a fourth column may include four pixels PX.

Referring to FIG. 8, a seventh sub-pixel block 113 among the sub-pixel blocks may include four outlines.

The seventh sub-pixel block 113 may include pixels PX. For example, the seventh sub-pixel block 113 may include sixteen pixels PX. For example, a shape of the seventh sub-pixel block 113 may be a square having four rows and four columns. For example, each of a first row, a second row, a third row, and a fourth row of the seventh sub-pixel block 113 may include four pixels PX.

Figure 9:
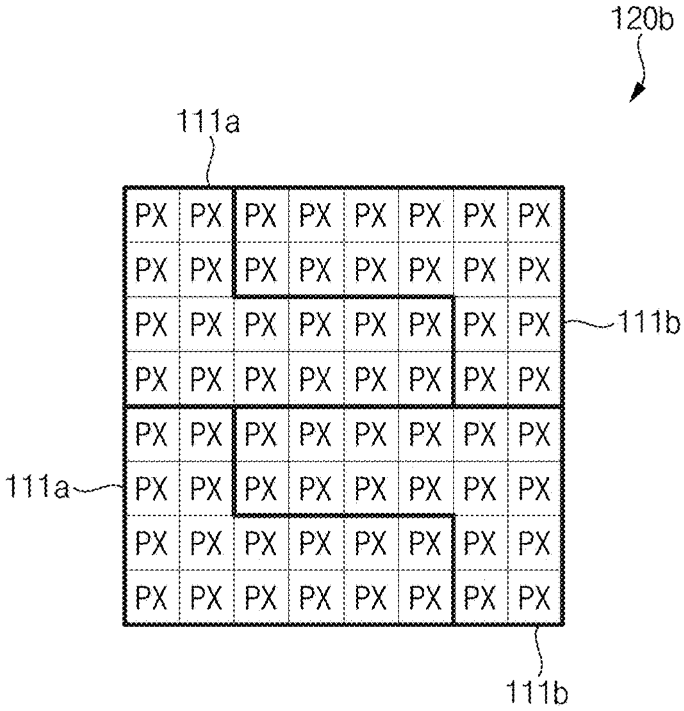
FIG. 9 is a diagram illustrating an example of a pixel block dividing a display panel of the display device of FIG. 1.

FIG. 9 is a diagram illustrating an example of a pixel block 120*b* dividing the display panel 100 of the display device 1 of FIG. 1.

Referring to FIG. 9, the display panel 100 may be divided into a plurality of pixel blocks. At least one pixel block among the pixel blocks may include pixels PX, and may be divided into the sub-pixel blocks, in which at least two of the sub-pixel blocks have the different shapes.

In an embodiment, a second pixel block 120*b* among the pixel blocks may be divided into the shapes of the fifth sub-pixel block 111*a* (e.g., see FIG. 6) and an eighth sub-pixel block 111*b*. A shape of the eighth sub-pixel block 111*b* may be symmetrical or substantially symmetrical to the shape of the fifth sub-pixel block 111*a*. The second pixel block 120*b* may include two fifth sub-pixel blocks 111*a* and two eight sub-pixel blocks 111*b*.

When the second pixel block 120*b* is divided into the fifth sub-pixel block 111*a* and the eighth sub-pixel block 111*b*, a length of an adjacent boundary of each of the fifth sub-pixel block 111*a* and the eighth sub-pixel block 111*b* may be equal to or substantially equal to the length of at least two pixels PX. The length of the adjacent boundary of each of the fifth sub-pixel block 111*a* and the eight sub-pixel block 111*b* may be equal to or substantially equal to a length of up to four pixels PX. In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible.

The number of the pixels PX included in the fifth sub-pixel block 111*a* and the eighth sub-pixel block 111*b* may be equal to or substantially equal to the number of pixels included in the comparative sub-pixel blocks. For example, each of the comparative sub-pixel blocks may include sixteen pixels, and each of the fifth sub-pixel block 111*a* and the eighth sub-pixel block 111*b* may include sixteen pixels PX. In other words, the memory capacity may decrease compared to that of a case of reducing the number of the pixels PX included in the fifth sub-pixel block 110*a* and the eighth sub-pixel block 111*b*, and reducing the length of the boundary of each of the fifth sub-pixel block 111*a* and the eighth sub-pixel block 111*b*. When the memory capacity decreases, the power consumption of the display device 1 may be decreased.

Figure 10:
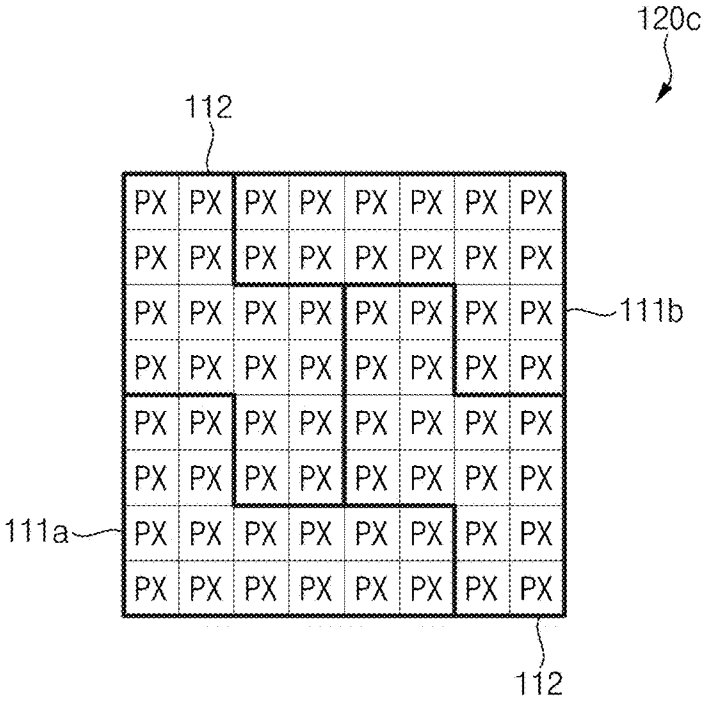
FIG. 10 is a diagram illustrating an example of a pixel block dividing a display panel of the display device of FIG. 1.

FIG. 10 is a diagram illustrating an example of a pixel block 120*c* dividing the display panel 100 of the display device 1 of FIG. 1.

Referring to FIG. 10, the display panel 100 may be divided into a plurality of pixel blocks. At least one pixel block among the pixel blocks may include pixels PX, and may divided into the sub-pixel blocks, in which is at least two of the sub-pixel blocks have the different shapes.

In an embodiment, a third pixel block 120*c* among the pixel blocks may be divided into the shapes of the fifth sub-pixel block 111*a*, the sixth sub-pixel block 112, and the eighth sub-pixel block 111*b*. The third pixel block 120*c* may include the fifth sub-pixel block 111*a*, the sixth sub-pixel block 112, and the eighth sub-pixel block 111*b*.

When the third pixel block 120*c* is divided into the fifth sub-pixel block 111*a*, the sixth sub-pixel block 112, and the eighth sub-pixel block 111*b*, a length of an adjacent boundary of each of the fifth sub-pixel block 111*a*, the sixth sub-pixel block 112, and the eighth sub-pixel block 111*b* may be equal to the length of at least two pixels PX. The length of the adjacent boundary of each of the fifth sub-pixel block 111*a*, sixth sub-pixel block 112, and the eight sub-pixel block 111*b* may be equal to a length of up to four pixels PX. In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible.

The number of the pixels PX included in the fifth sub-pixel block 111*a*, the sixth sub-pixel block 112, and the eighth sub-pixel block 111*b* may be equal to or substantially equal to the number of pixels included in the comparative sub-pixel blocks. For example, each of the comparative sub-pixel blocks may include sixteen pixels, and each of the fifth sub-pixel block 111*a*, the sixth sub-pixel block 112, and the eighth sub-pixel block 111*b* may include sixteen pixels PX. In other words, the memory capacity may be decreased compared to that of a case of reducing the number of the pixels PX included in the fifth sub-pixel block 110*a*, the sixth sub-pixel block 112, and the eighth sub-pixel block 111*b*, and reducing the length of the boundary of each of the fifth sub-pixel block 111*a*, the sixth sub-pixel block 112, and the eighth sub-pixel block 111*b*. When the memory capacity decreases, the power consumption of the display device 1 may be decreased.

Figure 11:
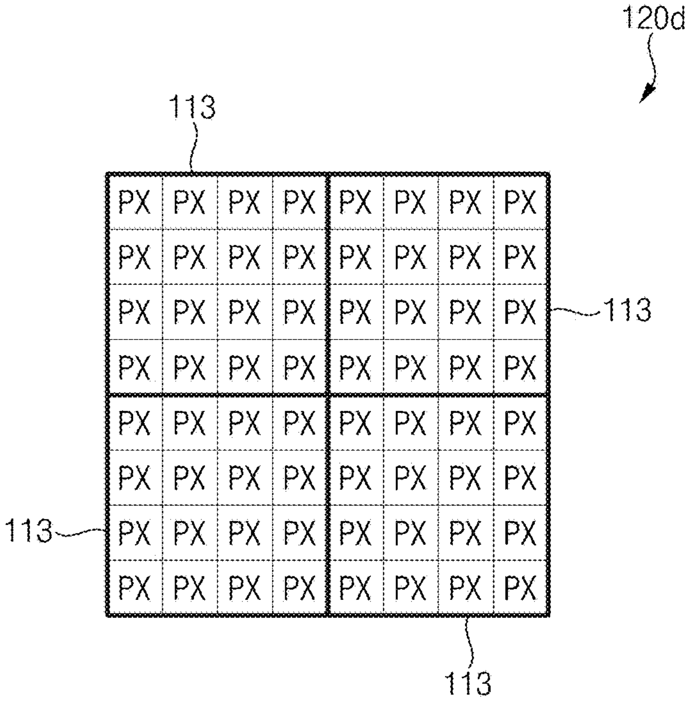
FIG. 11 is a diagram illustrating an example of a pixel block dividing a display panel of the display device of FIG. 1.

FIG. 11 is a diagram illustrating an example of a pixel block 120*d* dividing the display panel 100 of the display device 1 of FIG. 1.

Referring to FIG. 11, the display panel 100 may be divided into a plurality of pixel blocks. At least one pixel block among the pixel blocks may include pixels PX, and may divided into the sub-pixel blocks, in which is at least two of the sub-pixel blocks have the different shapes.

In an embodiment, a fourth pixel block 120*d* among the pixel blocks may be divided into a shape of the seventh sub-pixel block 113. The fourth pixel block 120*d* may include four seventh sub-pixel blocks 113.

Figure 12:
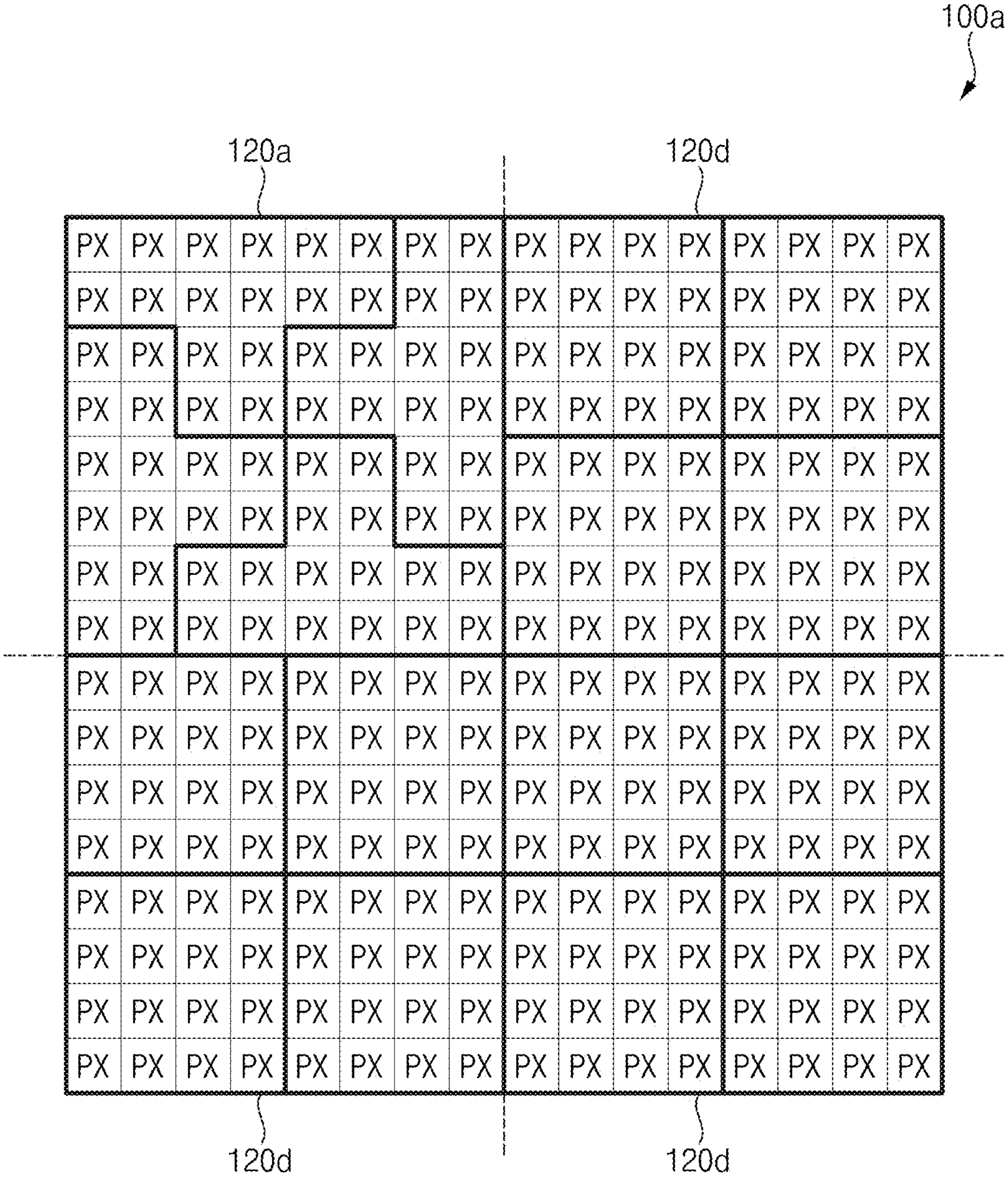
FIG. 12 is a diagram illustrating an example of a display panel of the display device of FIG. 1.

FIG. 12 is a diagram illustrating an example of a display panel 100*a* of the display device 1 of FIG. 1.

Referring to FIG. 12, the display panel 100*a* may be divided into a plurality of pixel blocks.

In an embodiment, the display panel 100*a* may be divided into the first pixel block 120*a* and the fourth pixel block 120*d*. For example, a first area where an afterimage may easily occur may be divided into the first pixel block 120*a*, and other areas except for the first area may be divided into the fourth pixel block 120*d*.

When the first pixel block 120*a* is divided into the first sub-pixel block 110*a*, the second sub-pixel block 110*b*, the third sub-pixel block 110*c*, and the fourth sub-pixel block 110*d*, the length of the adjacent boundary of each of the first sub-pixel block 110*a*, the second sub-pixel block 110*b*, the third sub-pixel block 110*c*, and the fourth sub-pixel block 110*d* may be equal to the length of two pixels PX. In other words, the length of the boundary of the sub-pixel blocks may be shorter than the length of the comparative boundary. Accordingly, even if a difference of each of the sub-pixels blocks occurs, the length of the boundary may be decreased, so that the afterimage may not be visible. When the first area of the display panel 100*a* is divided into the pixel blocks having the shape of the first pixel block 120*a*, the afterimage of the first area of the display panel 100*a* may not be visible.

The number of the pixels PX included in the first sub-pixel block 110*a*, the second sub-pixel block 110*b*, the third sub-pixel block 110*c*, and the fourth sub-pixel block 110*d* may be equal to the number of pixels included in the comparative sub-pixel blocks. For example, each of the comparative sub-pixel blocks may include sixteen pixels, and each of the first sub-pixel block 110*a*, the second sub-pixel block 110*b*, the third sub-pixel block 110*c*, and the fourth sub-pixel block 110*d* may include sixteen pixels PX. In other words, the memory capacity may be decreased compared to that of the case of reducing the number of the pixels PX included in the first sub-pixel block 110*a*, the second sub-pixel block 110*b*, the third sub-pixel block 110*c*, and the fourth sub-pixel block 110*d*, and reducing the length of the boundary of each of the first sub-pixel block 110*a*, the second sub-pixel block 110*b*, the third sub-pixel block 110*c*, and the fourth sub-pixel block 110*d*. When the memory capacity decreases, the power consumption of the display device 1 may be decreased.

Figure 13:
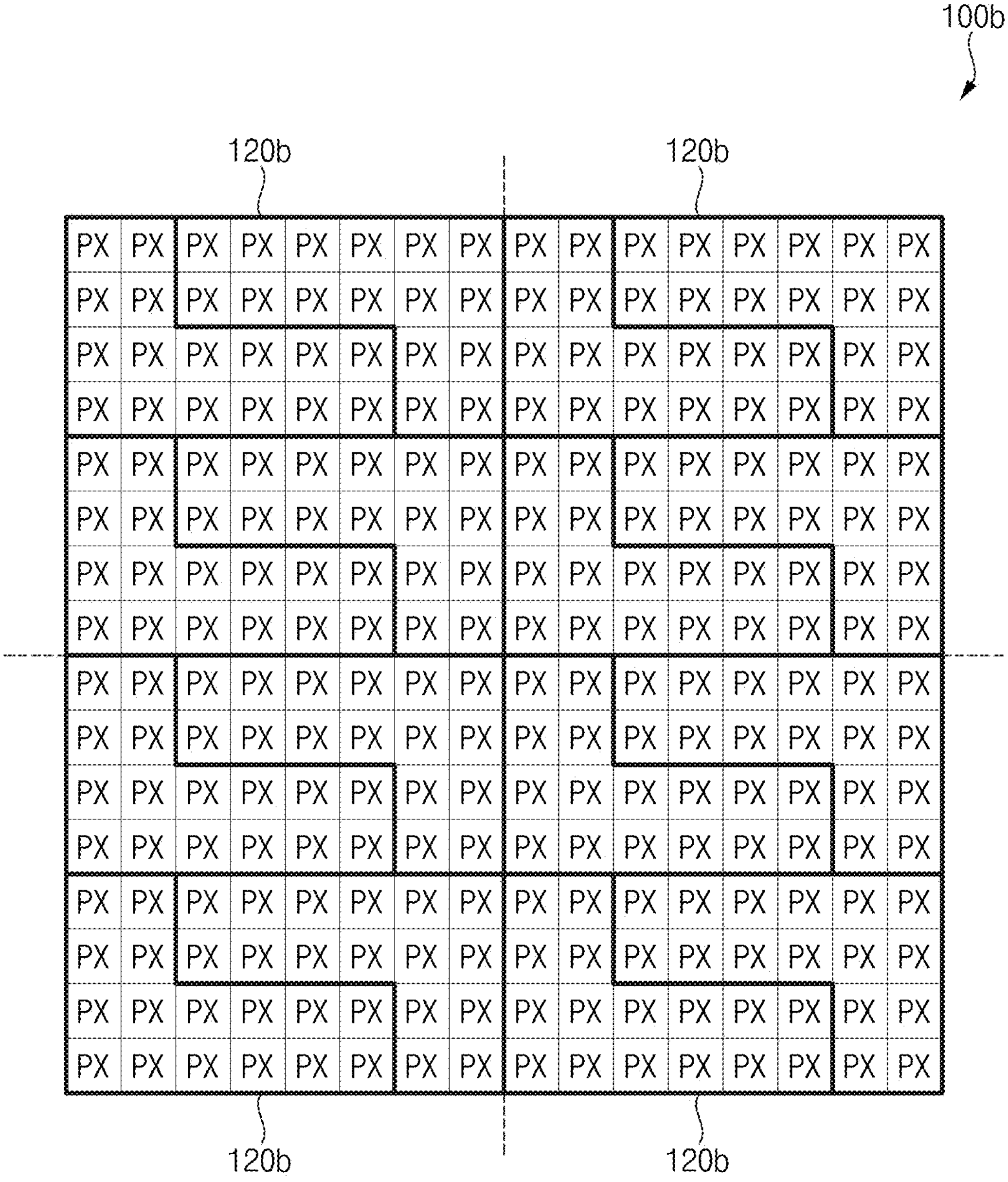
FIG. 13 is a diagram illustrating an example of a display panel of the display device of FIG. 1.

FIG. 13 is a diagram illustrating an example of a display panel 100*b* of the display device of FIG. 1.

Referring to FIG. 13, the display panel 100*b* may be divided into a plurality of pixel blocks.

In an embodiment, the display panel 100*b* may be divided into the second pixel block 120*b*. The second pixel block 120*b* may be divided into the fifth sub-pixel block 111*a* and the eighth sub-pixel block 111*b*.

When the second pixel block 120*b* is divided into the fifth sub-pixel block 111*a* and the eighth sub-pixel block 111*b*, the length of the adjacent boundary of each of the fifth sub-pixel block 111*a* and the eighth sub-pixel block 111*b* may be equal to the length of at least two pixels PX. The length of the adjacent boundary of each of the fifth sub-pixel block 111*a* and the eight sub-pixel block 111*b* may be equal to a length of up to four pixels PX. In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible.

The number of the pixels PX included in the fifth sub-pixel block 111*a* and the eighth sub-pixel block 111*b* may be equal to the number of pixels included in the comparative sub-pixel blocks. For example, each of the comparative sub-pixel blocks may include sixteen pixels, and each of the fifth sub-pixel block 111*a* and the eighth sub-pixel block 111*b* may include sixteen pixels PX. In other words, the memory capacity may be decreased compared to that of the case of reducing the number of the pixels PX included in the fifth sub-pixel block 110*a* and the eighth sub-pixel block 111*b*, and reducing the length of the boundary of each of the fifth sub-pixel block 111*a* and the eighth sub-pixel block 111*b*. When the memory capacity decreases, the power consumption of the display device 1 may be decreased.

Figure 14:
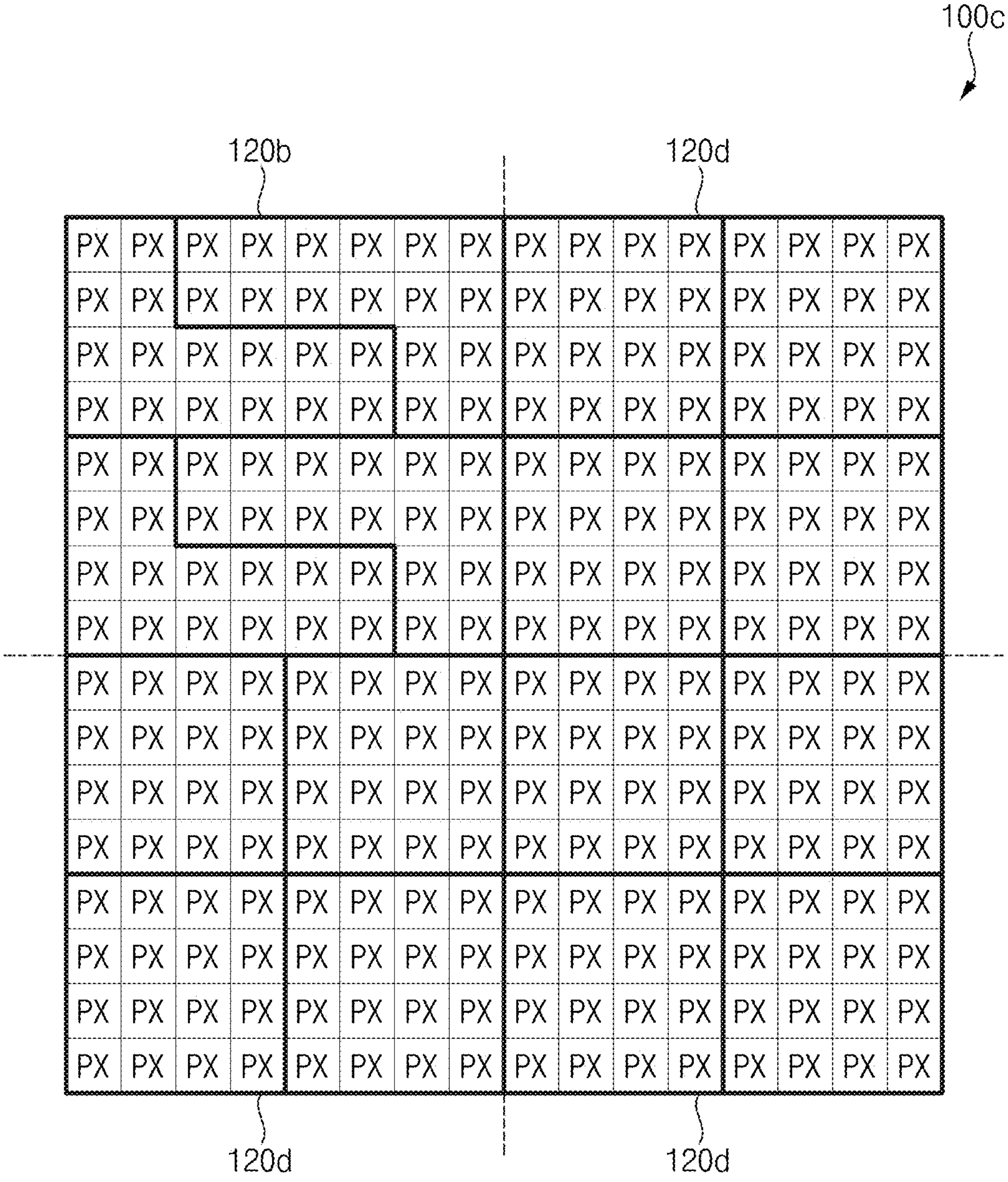
FIG. 14 is a diagram illustrating an example of a display panel of the display device of FIG. 1.

FIG. 14 is a diagram illustrating an example of a display panel 100*c* of the display device 1 of FIG. 1.

Referring to FIG. 14, the display panel 100*c* may be divided into a plurality of pixel blocks.

In an embodiment, the display panel 100*c* may be divided into the second pixel block 120*b* and the fourth pixel block 120*d*. For example, a first area where the afterimage may easily occur may be divided into the second pixel block 120*b*, and other areas except for the first area may be divided into the fourth pixel block 120*d*.

When the second pixel block 120*b* is divided into the fifth sub-pixel block 111*a* and the eighth sub-pixel block 111*b*, the length of the adjacent boundary of each of the fifth sub-pixel block 111*a* and the eighth sub-pixel block 111*b* may be equal to the length of at least two pixels PX. The length of the adjacent boundary of each of the fifth sub-pixel block 111*a* and the eight sub-pixel block 111*b* may be equal to a length of up to four pixels PX. In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible. When the first area of the display panel 100*c* is divided into the pixel blocks having the shape of the second pixel block 120*b*, the afterimage of the first area of the display panel 100*c* may not be visible.

The number of the pixels PX included in the fifth sub-pixel block 111*a* and the eighth sub-pixel block 111*b* may be equal to the number of pixels included in the comparative sub-pixel blocks. For example, each of the comparative sub-pixel blocks may include sixteen pixels, and each of the fifth sub-pixel block 111*a* and the eighth sub-pixel block 111*b* may include sixteen pixels PX. In other words, the memory capacity may be decreased compared to that of the case of reducing the number of the pixels PX included in the fifth sub-pixel block 110*a* and the eighth sub-pixel block 111*b*, and reducing the length of the boundary of each of the fifth sub-pixel block 111*a* and the eighth sub-pixel block 111*b*. When the memory capacity decreases, the power consumption of the display device 1 may be decreased.

Figure 15:
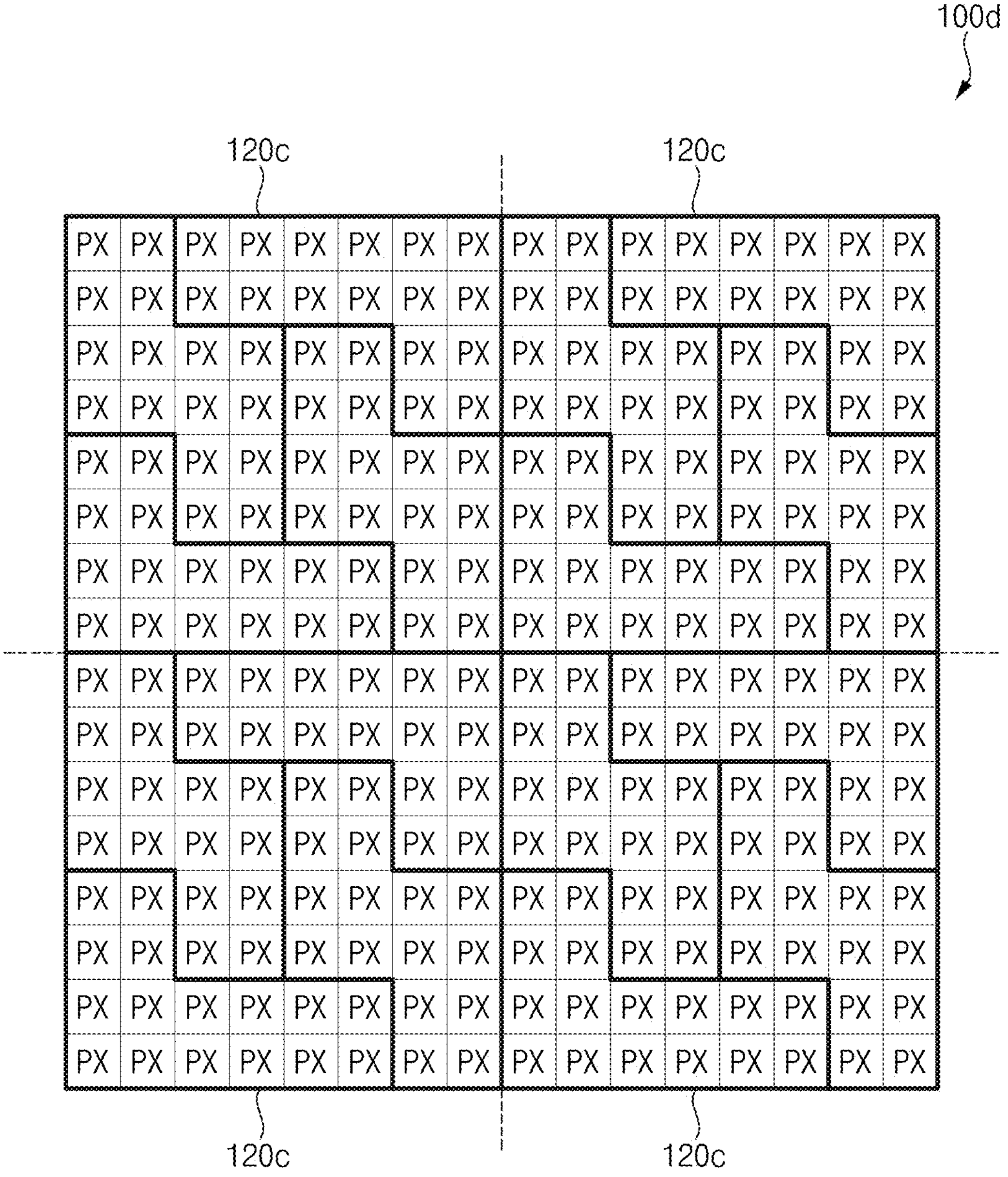
FIG. 15 is a diagram illustrating an example of a display panel of the display device of FIG. 1.

FIG. 15 is a diagram illustrating an example of a display panel 100*d* of the display device 1 of FIG. 1.

Referring to FIG. 15, the display panel 100*d* may be divided into a plurality of pixel blocks.

In an embodiment, the display panel 100*d* may be divided into the third pixel block 120*c*. The third pixel block 120*c* may be divided into the fifth sub-pixel block 111*a*, the sixth sub-pixel block 112, and the eighth sub-pixel block 111*b*.

When the third pixel block 120*c* is divided into the fifth sub-pixel block 111*a*, the sixth sub-pixel block 112, and the eighth sub-pixel block 111*b*, the length of the adjacent boundary of each of the fifth sub-pixel block 111*a*, the sixth sub-pixel block 112, and the eighth sub-pixel block 111*b* may be equal to the length of at least two pixels PX. The length of the adjacent boundary of each of the fifth sub-pixel block 111*a*, the sixth sub-pixel block 112, and the eight sub-pixel block 111*b* may be equal to a length of up to four pixels PX. In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible.

The number of the pixels PX included in the fifth sub-pixel block 111*a*, the sixth sub-pixel block 112, and the eighth sub-pixel block 111*b* may be equal to the number of pixels included in the comparative sub-pixel blocks. For example, each of the comparative sub-pixel blocks may include sixteen pixels, and each of the fifth sub-pixel block 111*a*, the sixth sub-pixel block 112, and the eighth sub-pixel block 111*b* may include sixteen pixels PX. In other words, the memory capacity may be decreased compared to that of the case of reducing the number of the pixels PX included in the fifth sub-pixel block 110*a*, the sixth sub-pixel block 112, and the eighth sub-pixel block 111*b*, and reducing the length of the boundary of each of the fifth sub-pixel block 111*a*, the sixth sub-pixel block 112, and the eighth sub-pixel block 111*b*. When the memory capacity decreases, the power consumption of the display device 1 may be decreased.

Figure 16:
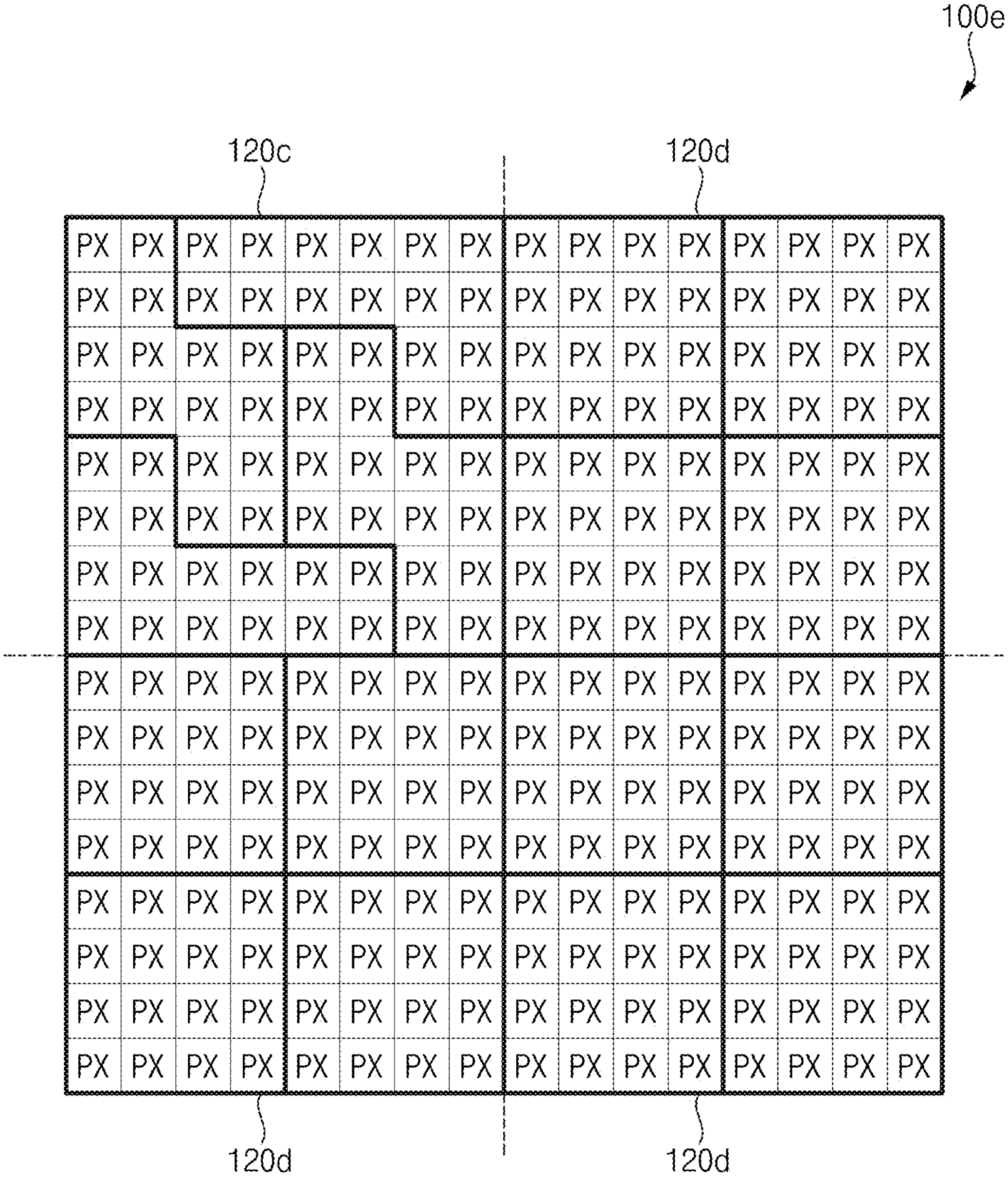
FIG. 16 is a diagram illustrating an example of a display panel of the display device of FIG. 1.

FIG. 16 is a diagram illustrating an example of a display panel 100*e* of the display device 1 of FIG. 1.

Referring to FIG. 16, the display panel 100*e* may be divided into a plurality of pixel blocks.

In an embodiment, the display panel 100*e* may be divided into the third pixel block 120*c* and the fourth pixel block 120*d*. For example, a first area where the afterimage may easily occur may be divided into the third pixel block 120*c*, and other areas except for the first area may be divided into the fourth pixel block 120*d*.

When the third pixel block 120*c* is divided into the fifth sub-pixel block 111*a*, the sixth sub-pixel block 112, and the eighth sub-pixel block 111*b*, the length of the adjacent boundary of each of the fifth sub-pixel block 111*a*, the sixth sub-pixel block 112, and the eighth sub-pixel block 111*b* may be equal to the length of at least two pixels PX. The length of the adjacent boundary of each of the fifth sub-pixel block 111*a*, the sixth sub-pixel block 112, and the eight sub-pixel block 111*b* may be equal to a length of up to four pixels PX. In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible. When the first area of the display panel 100*e* is divided into the pixel blocks having the shape of the third pixel block 120*c*, the afterimage of the first area of the display panel 100*e* may not be visible.

The number of the pixels PX included in the fifth sub-pixel block 111*a*, the sixth sub-pixel block 112, and the eighth sub-pixel block 111*b* may be equal to the number of pixels included in the comparative sub-pixel blocks. For example, each of the comparative sub-pixel blocks may include sixteen pixels, and each of the fifth sub-pixel block 111*a*, the sixth sub-pixel block 112, and the eighth sub-pixel block 111*b* may include sixteen pixels PX. In other words, the memory capacity may be decreased compared to that of the case of reducing the number of the pixels PX included in the fifth sub-pixel block 110*a*, the sixth sub-pixel block 112, and the eighth sub-pixel block 111*b*, and reducing the length of the boundary of each of the fifth sub-pixel block 111*a*, the sixth sub-pixel block 112, and the eighth sub-pixel block 111*b*. When the memory capacity decreases, the power consumption of the display device 1 may be decreased.

Figure 17:
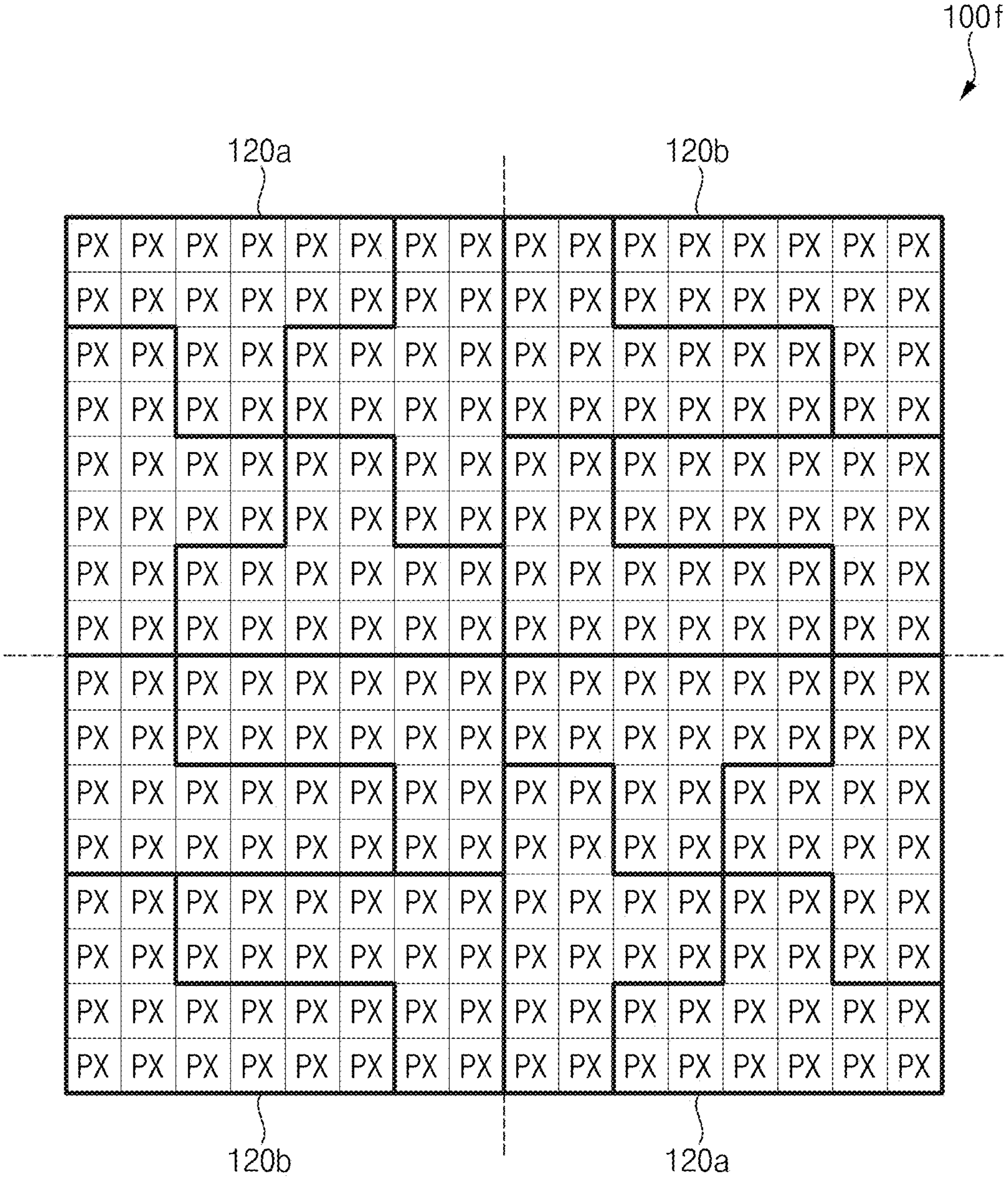
FIG. 17 is a diagram illustrating an example of a display panel of the display device of FIG. 1.

FIG. 17 is a diagram illustrating an example of a display panel 100*f* of the display device 1 of FIG. 1.

In an embodiment, a first area and a third area of the display panel 100*f* may be divided into the first pixel block 120*a*, and a second area and a fourth area of the display panel 100*f* may be divided into the second pixel block 120*b*. The first pixel block 120*a* may be divided into the first sub-pixel block 110*a*, the second sub-pixel block 110*b*, the third sub-pixel block 110*c*, and the fourth sub-pixel block 110*d*. The second pixel block 120*b* may be divided into the fifth sub-pixel block 111*a* and the eighth sub-pixel block 111*b*.

When the first pixel block 120*a* is divided into the first sub-pixel block 110*a*, the second sub-pixel block 110*b*, the third sub-pixel block 110*c*, and the fourth sub-pixel block 110*d*, the length of the adjacent boundary of each of the first sub-pixel block 110*a*, the second sub-pixel block 110*b*, the third sub-pixel block 110*c*, and the fourth sub-pixel block 110*d* may be equal to a length of two pixels PX.

When the second pixel block 120*b* is divided into the fifth sub-pixel block 111*a* and the eighth sub-pixel block 111*b*, the length of the adjacent boundary of each of the fifth sub-pixel block 111*a* and the eighth sub-pixel block 111*b* may be equal to the length of at least two pixels PX. The length of the adjacent boundary of each of the fifth sub-pixel block 111*a* and the eight sub-pixel block 111*b* may be equal to a length of up to four pixels PX.

In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible. When the display panel 100*f* is divided into a pixel block having the shape of the first pixel block 120*a* and the shape of the second pixel block 120*b*, the afterimage may not be visible in the display panel 100*f*.

The number of the pixels PX included in the first sub-pixel block 110*a*, the second sub-pixel block 110*b*, the third sub-pixel block 110*c*, and the fourth sub-pixel block 110*d*, the fifth sub-pixel block 111*a*, and the eighth sub-pixel block 111*b* may be equal to the number of pixels included in the comparative sub-pixel blocks. For example, each of the comparative sub-pixel blocks may include sixteen pixels, and each of the first sub-pixel block 110*a*, the second sub-pixel block 110*b*, the third sub-pixel block 110*c*, the fourth sub-pixel block 110*d*, the fifth sub-pixel block 111*a*, and the eighth sub-pixel block 111*b* may include sixteen pixels PX. In other words, the memory capacity may be decreased compared to that of the case of reducing the number of the pixels PX included in the first sub-pixel block 110*a*, the second sub-pixel block 110*b*, the third sub-pixel block 110*c*, the fourth sub-pixel block 110*d*, the fifth sub-pixel block 111*a*, and the eighth sub-pixel block 111*b*, and reducing the length of the boundary of each of the first sub-pixel block 110*a*, the second sub-pixel block 110*b*, the third sub-pixel block 110*c*, the fourth sub-pixel block 110*d*, the fifth sub-pixel block 111*a*, and the eighth sub-pixel block 111*b*. When the memory capacity decreases, the power consumption of the display device 1 may be decreased.

Figure 18:
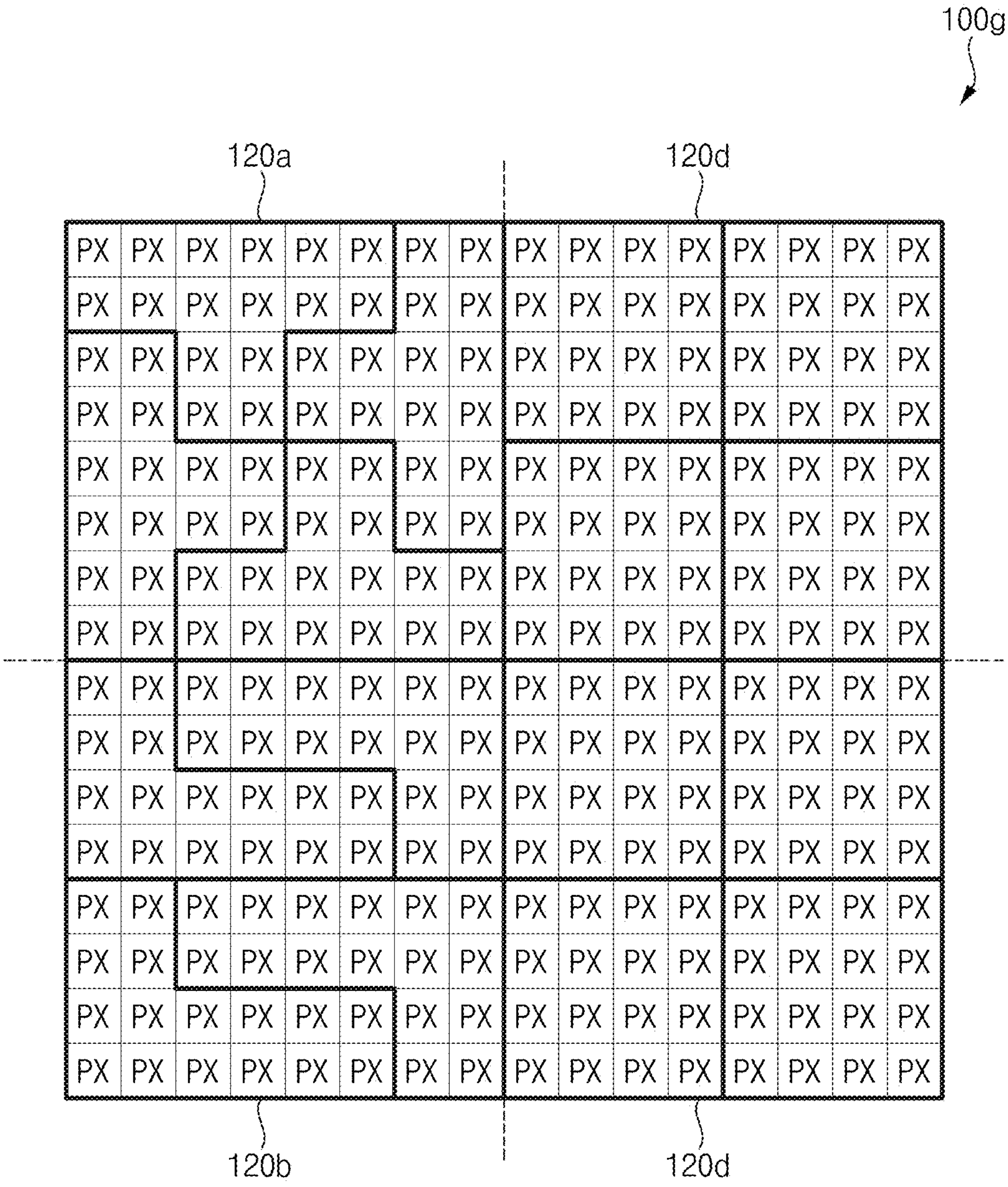
FIG. 18 is a diagram illustrating an example of a display panel of the display device of FIG. 1.

FIG. 18 is a diagram illustrating an example of a display panel 100*g* of the display device 1 of FIG. 1.

Referring to FIG. 18, the display panel 100*g* may be divided into a plurality of pixel blocks.

In an embodiment, the display panel 100*g* may be divided into the first pixel blocks 120*a*, the second pixel blocks 120*b*, and the fourth pixel blocks 120*d*. For example, a first area where the afterimage may easily occur may be divided into the first pixel block 120*a*, a second area where the afterimage may easily occur may be divided into the second pixel block 120*b*, and other areas except for the first area and the second area may be divided into the fourth pixel block 120*d*.

When the first pixel block 120*a* is divided into the first sub-pixel block 110*a*, the second sub-pixel block 110*b*, the third sub-pixel block 110*c*, and the fourth sub-pixel block 110*d*, the length of the adjacent boundary of each of the first sub-pixel block 110*a*, the second sub-pixel block 110*b*, the third sub-pixel block 110*c*, and the fourth sub-pixel block 110*d* may be equal to the length of at least two pixels PX.

When the second pixel block 120*b* is divided into the fifth sub-pixel block 111*a* and the eighth sub-pixel block 111*b*, the length of the adjacent boundary of each of the fifth sub-pixel block 111*a* and the eighth sub-pixel block 111*b* may be equal to the length of two pixels PX. The length of the adjacent boundary of each of the fifth sub-pixel block 111*a* and the eight sub-pixel block 111*b* may be equal to a length of up to four pixels PX.

In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible. When the first area of the display panel 100*g* is divide into the pixel blocks having the shape of the first pixel block 120*a*, and the second area of display panel 100*g* is divided into the pixel blocks having the shape of the second pixel block 120*b*, the afterimage may not be visible in the first area and the second area of the display panel 100*g*.

The number of the pixels PX included in the first sub-pixel block 110*a*, the second sub-pixel block 110*b*, the third sub-pixel block 110*c*, the fourth sub-pixel block 110*d*, the fifth sub-pixel block 111*a*, and the eighth sub-pixel block 111*b* may be equal to the number of pixels included in the comparative sub-pixel blocks. For example, each of the comparative sub-pixel blocks may include sixteen pixels, and each of the first sub-pixel block 110*a*, the second sub-pixel block 110*b*, the third sub-pixel block 110*c*, the fourth sub-pixel block 110*d*, the fifth sub-pixel block 111*a*, and the eighth sub-pixel block 111*b* may include sixteen pixels PX. In other words, the memory capacity may be decreased compared to that of the case of reducing the number of the pixels PX included in the first sub-pixel block 110*a*, the second sub-pixel block 110*b*, the third sub-pixel block 110*c*, the fourth sub-pixel block 110*d*, the fifth sub-pixel block 111*a*, and the eighth sub-pixel block 111*b*, and reducing the length of the boundary of each of the first sub-pixel block 110*a*, the second sub-pixel block 110*b*, the third sub-pixel block 110*c*, the fourth sub-pixel block 110*d*, the fifth sub-pixel block 111*a*, and the eighth sub-pixel block 111*b*. When the memory capacity decreases, the power consumption of the display device 1 may be decreased.

Figure 19:
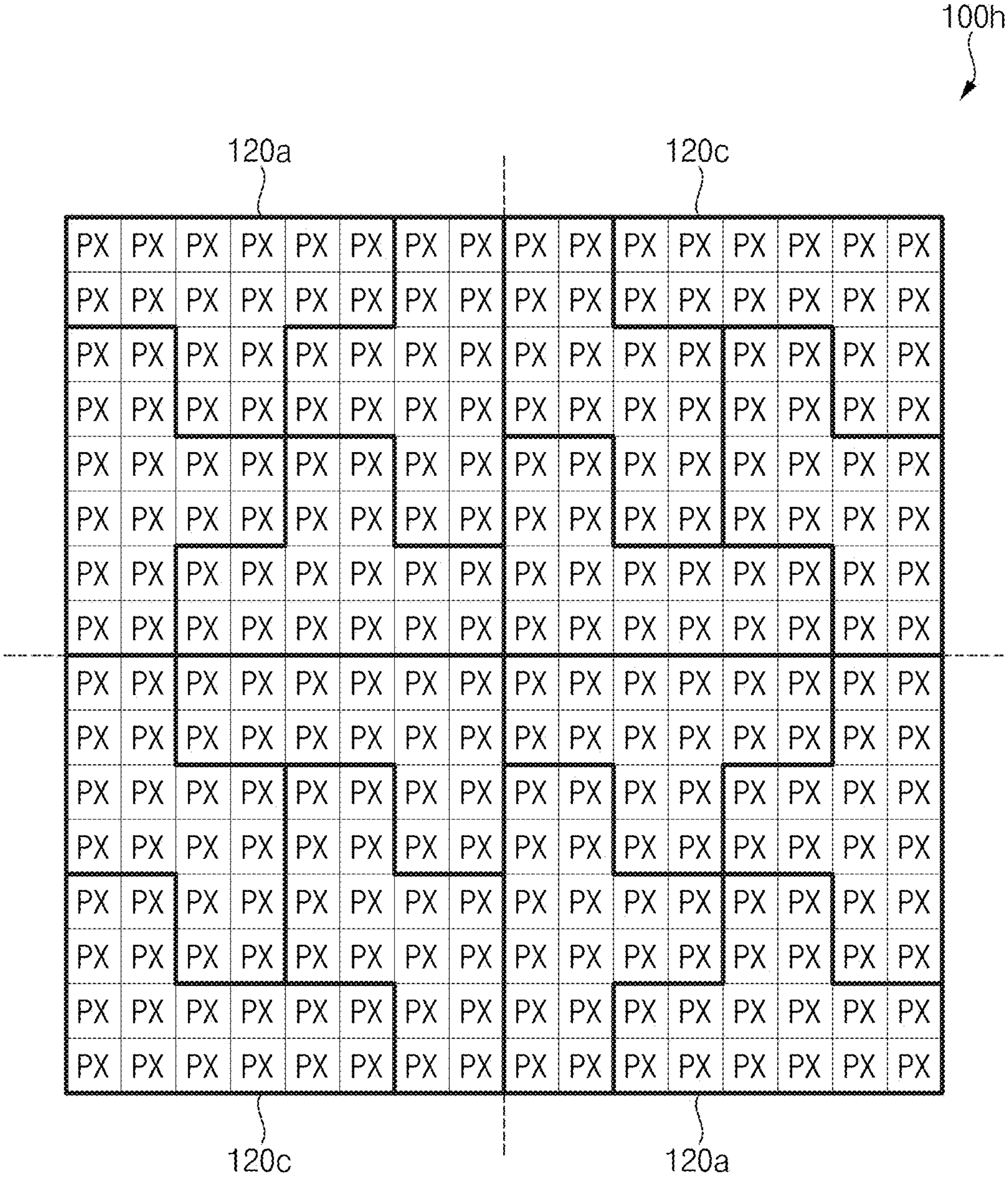
FIG. 19 is a diagram illustrating an example of a display panel of the display device of FIG. 1.

FIG. 19 is a diagram illustrating an example of a display panel 100*h* of the display device 1 of FIG. 1.

Referring to FIG. 19, the display panel 100*h* may be divided into a plurality of pixel blocks.

In an embodiment, a first area and a third area of the display panel 100*h* may be divided into the first pixel blocks 120*a*, and a second area and a fourth area of the display panel 100*h* may be divided into the third pixel blocks 120*c*. The first pixel block 120*a* may be divided into the first sub-pixel block 110*a*, the second sub-pixel block 110*b*, the third sub-pixel block 110*c*, and the fourth sub-pixel block 110*d*. The third pixel block 120*c* may be divided into the fifth sub-pixel block 111*a*, the sixth sub-pixel block 112, and the eighth sub-pixel block 111*b*.

When the first pixel block 120*a* is divided into the first sub-pixel block 110*a*, the second sub-pixel block 110*b*, the third sub-pixel block 110*c*, and the fourth sub-pixel block 110*d*, the length of the adjacent boundary of each of the first sub-pixel block 110*a*, the second sub-pixel block 110*b*, the third sub-pixel block 110*c*, and the fourth sub-pixel block 110*d* may be equal to the length of at least two pixels PX.

When the second pixel block 120*b* is divided into the fifth sub-pixel block 111*a*, the sixth sub-pixel block 112, and the eighth sub-pixel block 111*b*, the length of the adjacent boundary of each of the fifth sub-pixel block 111*a*, the sixth sub-pixel block 112, and the eighth sub-pixel block 111*b* may be equal to the length of two pixels PX. The length of the adjacent boundary of each of the fifth sub-pixel block 111*a*, the sixth sub-pixel block 112, and the eight sub-pixel block 111*b* may be equal to a length of up to four pixels PX.

In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible. When the first area of the display panel 100*h* is divide into the pixel blocks having the shape of the first pixel block 120*a* and the third pixel block 120*c*, the afterimage may not be visible in the display panel 100*h*.

The number of the pixels PX included in the first sub-pixel block 110*a*, the second sub-pixel block 110*b*, the third sub-pixel block 110*c*, the fourth sub-pixel block 110*d*, the fifth sub-pixel block 111*a*, the sixth sub-pixel block 112, and the eighth sub-pixel block 111*b* may be equal to the number of pixels included in the comparative sub-pixel blocks. For example, each of the comparative sub-pixel blocks may include sixteen pixels, and each of the first sub-pixel block 110*a*, the second sub-pixel block 110*b*, the third sub-pixel block 110*c*, the fourth sub-pixel block 110*d*, the fifth sub-pixel block 111*a*, the sixth sub-pixel block 112, and the eighth sub-pixel block 111*b* may include sixteen pixels PX. In other words, the memory capacity may be decreased compared to that of the case of reducing the number of the pixels PX included in the first sub-pixel block 110*a*, the second sub-pixel block 110*b*, the third sub-pixel block 110*c*, the fourth sub-pixel block 110*d*, the fifth sub-pixel block 111*a*, the sixth sub-pixel block 112, and the eighth sub-pixel block 111*b*, and reducing the length of the boundary of each of the first sub-pixel block 110*a*, the second sub-pixel block 110*b*, the third sub-pixel block 110*c*, the fourth sub-pixel block 110*d*, the fifth sub-pixel block 111*a*, the sixth sub-pixel block 112, and the eighth sub-pixel block 111*b*. When the memory capacity decreases, the power consumption of the display device 1 may be decreased.

Figure 20:
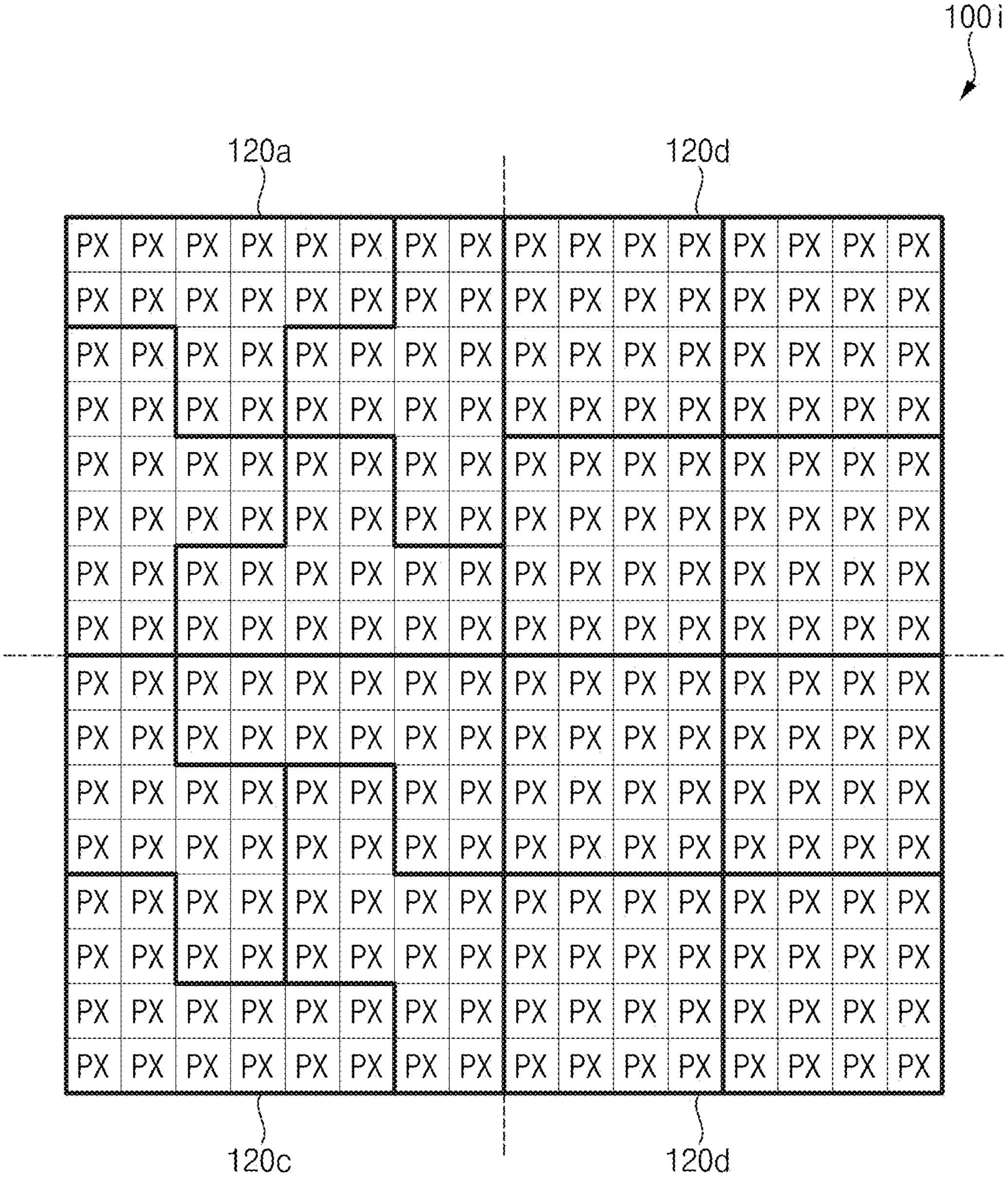
FIG. 20 is a diagram illustrating an example of a display panel of the display device of FIG. 1.

FIG. 20 is a diagram illustrating an example of a display panel 100*i* of the display device 1 of FIG. 1.

Referring to FIG. 20, the display panel 100*i* may be divided into a plurality of pixel blocks.

In an embodiment, the display panel 100*i* may be divided into the first sub-pixel block 120*a*, the third sub-pixel block 120*c*, and the fourth sub-pixel blocks 120*d*. For example, a first area where the afterimage may easily occur may be divided into the first pixel block 120*a*, a second area where the afterimage may easily occur may be divided into the third pixel block 120*c* and other areas except for the first area and the second area may be divided into the fourth pixel blocks 120*d*.

When the first pixel block 120*a* is divided into the first sub-pixel block 110*a*, the second sub-pixel block 110*b*, the third sub-pixel block 110*c*, and the fourth sub-pixel block 110*d*, the length of the adjacent boundary of each of the first sub-pixel block 110*a*, the second sub-pixel block 110*b*, the third sub-pixel block 110*c*, and the fourth sub-pixel block 110*d* may be equal to the length of at least two pixels PX.

When the third pixel block 120*c* is divided into the fifth sub-pixel block 111*a*, the sixth sub-pixel block 112, and the eighth sub-pixel block 111*b*, the length of the adjacent boundary of each of the fifth sub-pixel block 111*a*, the sixth sub-pixel block 112, and the eighth sub-pixel block 111*b* may be equal to the length of two pixels PX. The length of the adjacent boundary of each of the fifth sub-pixel block 111*a*, the sixth sub-pixel block 112, and the eight sub-pixel block 111*b* may be equal to a length of up to four pixels PX.

In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible. When the first area of the display panel 100*i* is divide into the pixel blocks having the shape of the first pixel block 120*a*, and the second area of the display panel 100*i* is divided into the pixel blocks having the shape of the third pixel block 120*c,* the afterimage may not be visible in the first area and the second area the display panel 100*i.*

The number of the pixels PX included in the first sub-pixel block 110*a,* the second sub-pixel block 110*b,* the third sub-pixel block 110*c,* the fourth sub-pixel block 110*d,* the fifth sub-pixel block 111*a,* the sixth sub-pixel block 112, and the eighth sub-pixel block 111*b* may be equal to the number of pixels included in the comparative sub-pixel blocks. For example, each of the comparative sub-pixel blocks may include sixteen pixels, and each of the first sub-pixel block 110*a,* the second sub-pixel block 110*b,* the third sub-pixel block 110*c,* the fourth sub-pixel block 110*d,* the fifth sub-pixel block 111*a,* the sixth sub-pixel block 112, and the eighth sub-pixel block 111*b* may include sixteen pixels PX. In other words, the memory capacity may be decreased compared to that of the case of reducing the number of the pixels PX included in the first sub-pixel block 110*a,* the second sub-pixel block 110*b,* the third sub-pixel block 110*c,* the fourth sub-pixel block 110*d,* the fifth sub-pixel block 111*a,* the sixth sub-pixel block 112, and the eighth sub-pixel block 111*b,* and reducing the length of the boundary of each of the first sub-pixel block 110*a,* the second sub-pixel block 110*b,* the third sub-pixel block 110*c,* the fourth sub-pixel block 110*d,* the fifth sub-pixel block 111*a,* the sixth sub-pixel block 112, and the eighth sub-pixel block 111*b.* When the memory capacity decreases, the power consumption of the display device 1 may be decreased.

Figure 21:
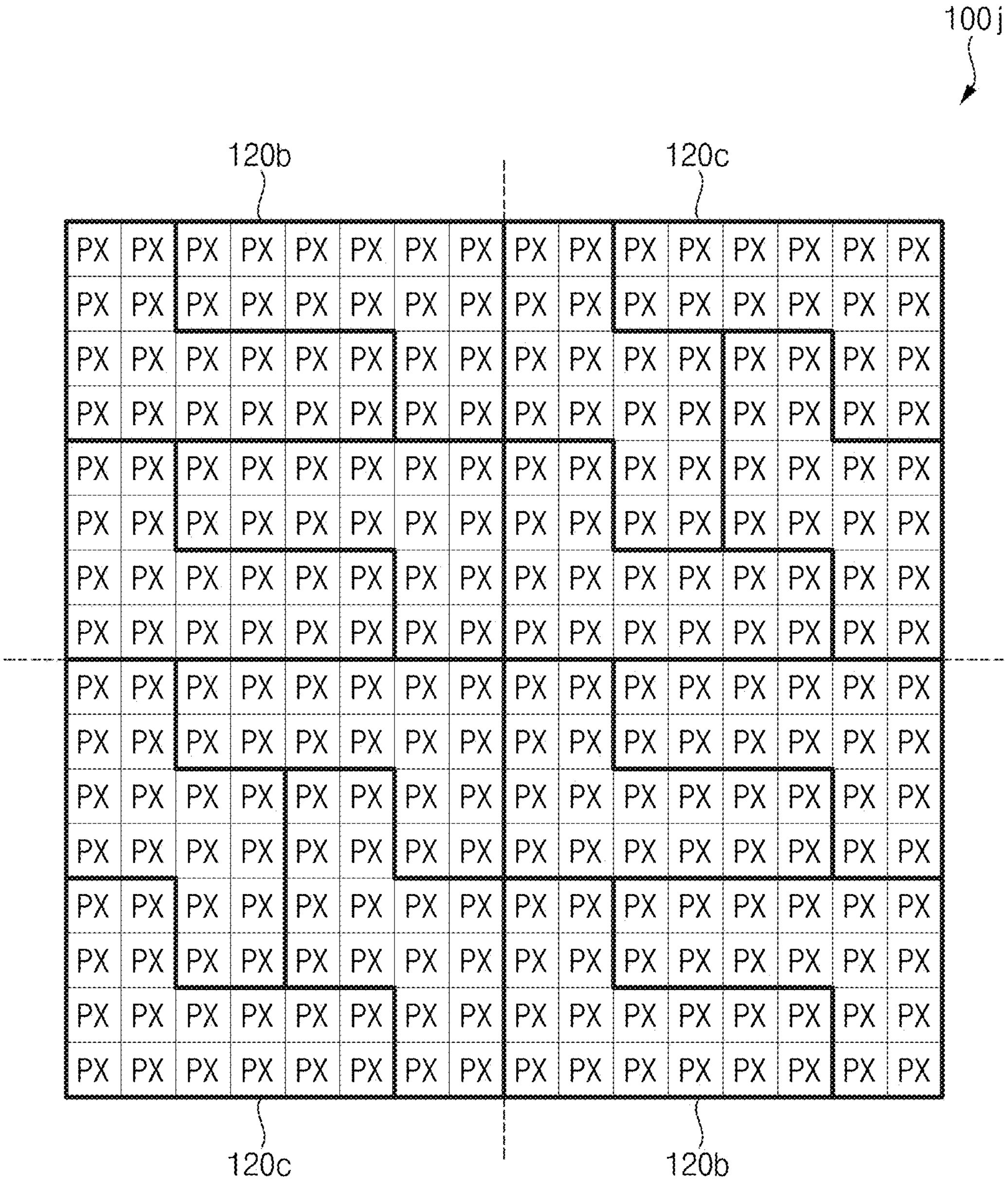
FIG. 21 is a diagram illustrating an example of a display panel of the display device of FIG. 1.

FIG. 21 is a diagram illustrating an example of a display panel 100*j* of the display device 1 of FIG. 1.

Referring to FIG. 21, the display panel 100*j* may be divided into a plurality of pixel blocks.

In an embodiment, a first area and a third area of the display panel 100*j* may be divided into the second sub-pixel blocks 120*b,* and a second area and a fourth area of the display panel 100*j* may be divided into the third pixel blocks 120*c.* The second pixel block 120*b* may be divided into the fifth sub-pixel blocks 111*a* and the eighth sub-pixel blocks 111*b.* The third pixel block 120*c* may be divided into the fifth sub-pixel block 111*a,* the sixth sub-pixel blocks 112, and the eighth sub-pixel block 111*b.*

When the second pixel block 120*a* is divided into the fifth sub-pixel blocks 111*a* and the eighth sub-pixel blocks 111*b,* the length of the adjacent boundary of each of the fifth sub-pixel blocks 111*a* and the eighth sub-pixel blocks 111*b* may be equal to the length of at least two pixels PX. The length of the adjacent boundary of each of the fifth sub-pixel blocks 111*a* and the eight sub-pixel blocks 111*b* may be equal to a length of up to four pixels PX.

When the third pixel block 120*c* is divided into the fifth sub-pixel block 111*a,* the sixth sub-pixel blocks 112, and the eighth sub-pixel block 111*b,* the length of the adjacent boundary of each of the fifth sub-pixel block 111*a,* the sixth sub-pixel blocks 112, and the eighth sub-pixel block 111*b* may be equal to the length of at least two pixels PX. The length of the adjacent boundary of each of the fifth sub-pixel block 111*a,* the sixth sub-pixel blocks 112, and the eight sub-pixel block 111*b* may be equal to a length of up to four pixels PX.

In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible. When the display panel 100*j* is divided into the pixel blocks having the shape of the second pixel block 120*b,* and the display panel 100*j* is divided into the pixel blocks having the shape of the third pixel block 120*c,* the afterimage may not be visible in the first area and the second area of the display panel 100*j.*

The number of the pixels PX included in the fifth sub-pixel block 111*a,* the sixth sub-pixel block 112, and the eighth sub-pixel 111*b* block may be equal to the number of pixels included in the comparative sub-pixel blocks. For example, each of the comparative sub-pixel blocks may include sixteen pixels, and each of the fifth sub-pixel block 111*a,* the sixth sub-pixel block 112, and the eighth sub-pixel 111*b* block may include sixteen pixels PX. In other words, the memory capacity may be decreased compared to that of the case of reducing the number of the pixels PX included in the fifth sub-pixel block 111*a,* the sixth sub-pixel block 112, and the eighth sub-pixel 111*b* block, and reducing the length of the boundary of each of the fifth sub-pixel block 111*a,* the sixth sub-pixel block 112, and the eighth sub-pixel 111*b* block. When the memory capacity decreases, the power consumption of the display device 1 may be decreased.

Figure 22:
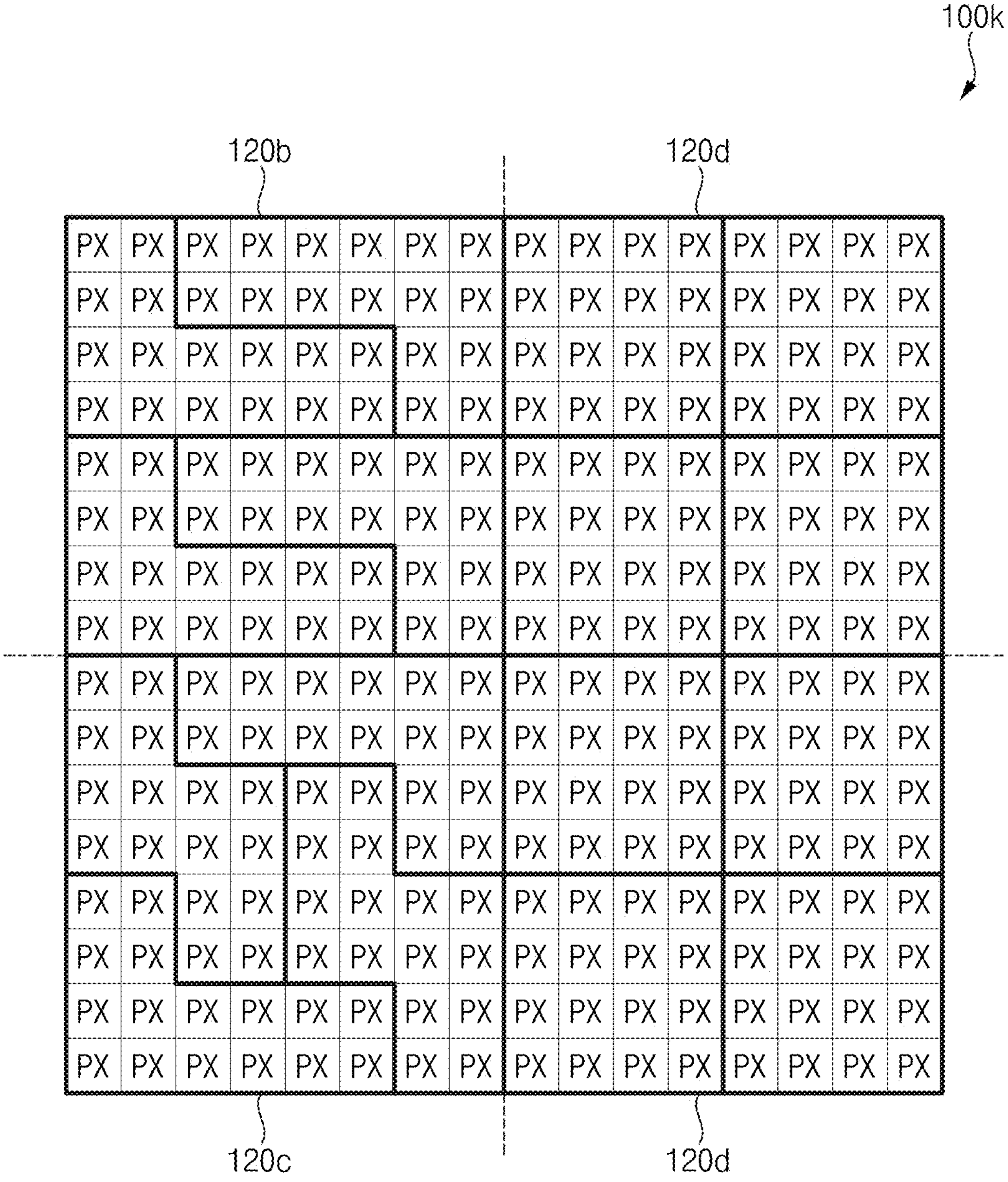
FIG. 22 is a diagram illustrating an example of a display panel of the display device of FIG. 1.

FIG. 22 is a diagram illustrating an example of a display panel 100*k* of the display device 1 of FIG. 1.

Referring to FIG. 22, the display panel 100*k* may be divided into a plurality of pixel blocks.

In an embodiment, the display panel 100*k* may be divided into the second sub-pixel block 120*b,* the third sub-pixel block 120*c,* and the fourth sub-pixel blocks 120*d.* For example, a first area where the afterimage may easily occur may be divided into the second pixel block 120*b,* a second area where the afterimage may easily occur may be divided into the third pixel block 120*c,* and other areas except for the first area and the second area may be divided into the fourth pixel blocks 120*d.*

When the second pixel block 120*b* is divided into the fifth sub-pixel blocks 111*a* and the eighth sub-pixel blocks 111*b,* the length of the adjacent boundary of each of the fifth sub-pixel blocks 111*a* and the eighth sub-pixel blocks 111*b* may be equal to the length of at least two pixels PX. The length of the adjacent boundary of each of the fifth sub-pixel blocks 111*a* and the eighth sub-pixel blocks 111*b* may be equal to a length of up to four pixels PX.

When the third pixel block 120*c* is divided into the fifth sub-pixel block 111*a,* the sixth sub-pixel blocks 112, and the eighth sub-pixel block 111*b,* the length of the adjacent boundary of each of the fifth sub-pixel block 111*a,* the sixth sub-pixel blocks 112, and the eighth sub-pixel block 111*b* may be equal to the length of at least two pixels PX. The length of the adjacent boundary of each of the fifth sub-pixel block 111*a,* the sixth sub-pixel blocks 112, and the eight sub-pixel block 111*b* may be equal to a length of up to four pixels PX.

In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible. When the first area of the display panel 100*k* is divided into the pixel blocks having the shape of the second pixel block 120*b,* and the second area of the display panel 100*k* is divided into the pixel blocks having the shape of the third pixel block 120*c,* the afterimage may not be visible in the first area and the second area the display panel 100*k.*

The number of the pixels PX included in the fifth sub-pixel block 111*a,* the sixth sub-pixel block 112, and the eighth sub-pixel block 111*b* may be equal to the number of pixels included in the comparative sub-pixel blocks. For example, each of the comparative sub-pixel blocks may include sixteen pixels, and each of the fifth sub-pixel block 111*a*, the sixth sub-pixel block 112, and the eighth sub-pixel block 111*b* may include sixteen pixels PX. In other words, the memory capacity may be decreased compared to that of the case of reducing the number of the pixels PX included in the fifth sub-pixel block 111*a*, the sixth sub-pixel block 112, and the eighth sub-pixel block 111*b*, and reducing the length of the boundary of each of the fifth sub-pixel block 111*a*, the sixth sub-pixel block 112, and the eighth sub-pixel block 111*b*. When the memory capacity decreases, the power consumption of the display device 1 may be decreased.

Figure 23:
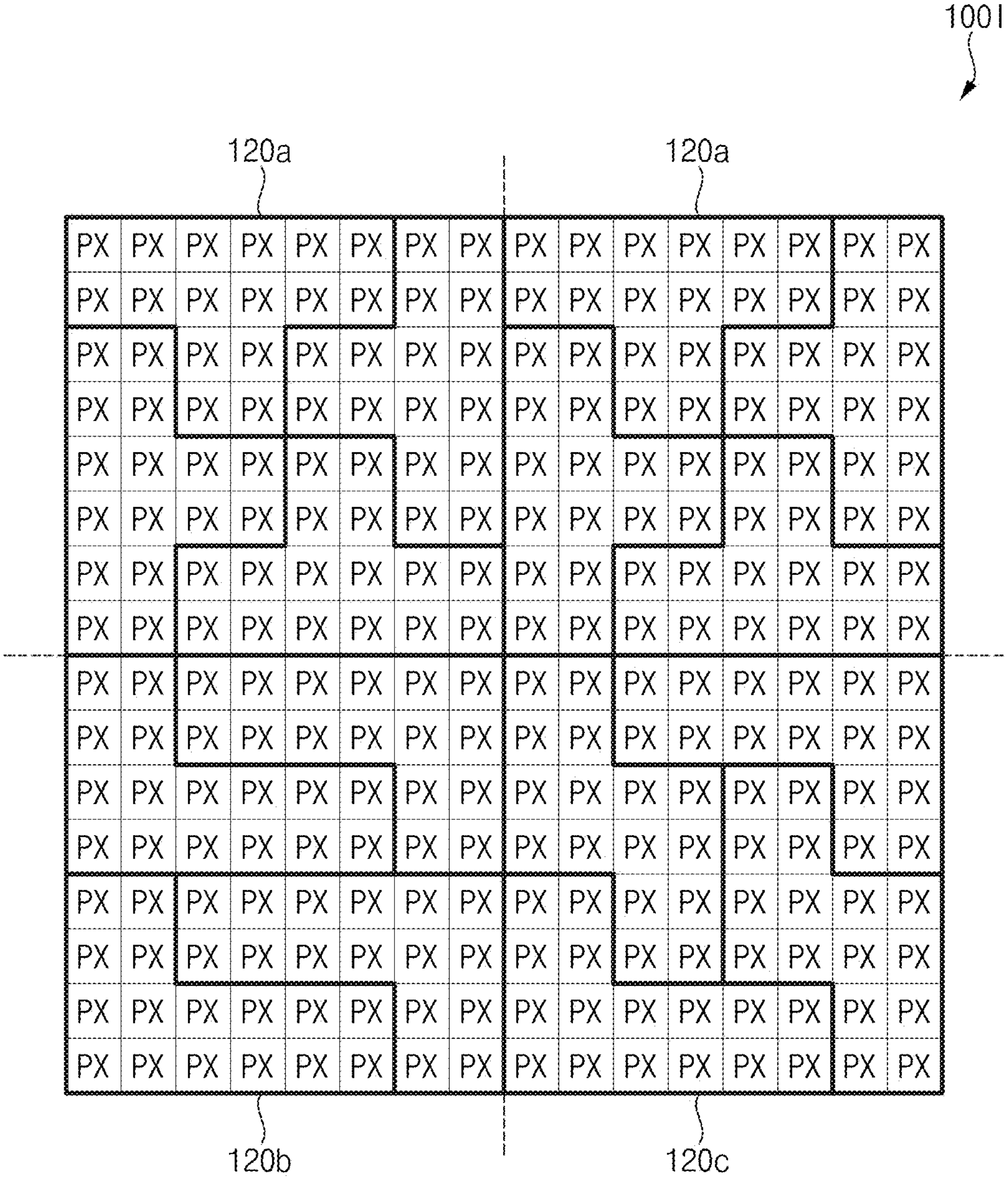
FIG. 23 is a diagram illustrating an example of a display panel of the display device of FIG. 1.

FIG. 23 is a diagram illustrating an example of a display panel 1001 of the display device 1 of FIG. 1.

Referring to FIG. 23, the display panel 1001 may be divided into a plurality of pixel blocks.

In an embodiment, a first area and a fourth area of the display panel 1001 may be divided into the first pixel blocks 120*a*, a second area of the display panel 1001 may be divided into the second pixel block 120*b*, and a third area of the display panel 1001 may be divided into the third pixel block 120*c*. The first pixel block 120*a* may be divided into the first sub-pixel block 110*a*, the second sub-pixel block 110*b*, the third sub-pixel block 110*c*, and the fourth sub-pixel block 110*d*, The second pixel block 120*b* may be divided into the fifth sub-pixel blocks 111*a* and the eighth sub-pixel blocks 111*b*. The third pixel block 120*c* may be divided into the fifth sub-pixel block 111*a*, the sixth pixel block 112, and the eighth sub-pixel block 111*b*.

When the first pixel block 120*a* is divided into the first sub-pixel block 110*a*, the second sub-pixel block 110*b*, the third sub-pixel block 110*c*, and the fourth sub-pixel block 110*d*, the length of the adjacent boundary of each of the first sub-pixel block 110*a*, the second sub-pixel block 110*b*, the third sub-pixel block 110*c*, and the fourth sub-pixel block 110*d* may be equal to the length of two pixels PX.

When the second pixel block 120*b* is divided into the fifth sub-pixel blocks 111*a* and the eighth sub-pixel blocks 111*b*, the length of the adjacent boundary of each of the fifth sub-pixel blocks 111*a* and the eighth sub-pixel blocks 111*b* may be equal to the length of at least two pixels PX. The length of the adjacent boundary of each of the fifth sub-pixel blocks 111*a* and the eight sub-pixel blocks 111*b* may be equal to a length of up to four pixels PX.

When the third pixel block 120*c* is divided into the fifth sub-pixel block 111*a*, the sixth sub-pixel blocks 112, and the eighth sub-pixel block 111*b*, the length of the adjacent boundary of each of the fifth sub-pixel block 111*a*, the sixth sub-pixel blocks 112, and the eighth sub-pixel block 111*b* may be equal to the length of at least two pixels PX. The length of the adjacent boundary of each of the fifth sub-pixel block 111*a*, the sixth sub-pixel blocks 112, and the eight sub-pixel block 111*b* may be equal to a length of up to four pixels PX.

In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible. When the display panel 100*l* is divided into the pixel blocks having the shape of the first pixel block 120*a*, the display panel 100*l* is divided into the pixel blocks having the shape of the second pixel block 120*b*, and the display panel 1001 is divided into the pixel blocks having the shape of the third pixel block 120*c*, the afterimage may not be visible in the display panel 1001.

The number of the pixels PX included in the first sub-pixel block 110*a*, the second sub-pixel block 110*b*, the third sub-pixel block 110*c*, the fourth sub-pixel block 110*d*, the fifth sub-pixel block 111*a*, the sixth sub-pixel block 112, and the eighth sub-pixel block 111*b* may be equal to the number of pixels included in the comparative sub-pixel blocks. For example, each of the comparative sub-pixel blocks may include sixteen pixels, and each of the first sub-pixel block 110*a*, the second sub-pixel block 110*b*, the third sub-pixel block 110*c*, the fourth sub-pixel block 110*d*, the fifth sub-pixel block 111*a*, the sixth sub-pixel block 112, and the eighth sub-pixel block 111*b* may include sixteen pixels PX. In other words, the memory capacity may be decreased compared to that of the case of reducing the number of the pixels PX included in the first sub-pixel block 110*a*, the second sub-pixel block 110*b*, the third sub-pixel block 110*c*, the fourth sub-pixel block 110*d*, the fifth sub-pixel block 111*a*, the sixth sub-pixel block 112, and the eighth sub-pixel block 111*b*, and reducing the length of the boundary of each of the first sub-pixel block 110*a*, the second sub-pixel block 110*b*, the third sub-pixel block 110*c*, the fourth sub-pixel block 110*d*, the fifth sub-pixel block 111*a*, the sixth sub-pixel block 112, and the eighth sub-pixel block 111*b*. When the memory capacity decreases, the power consumption of the display device 1 may be decreased.

Figure 24:
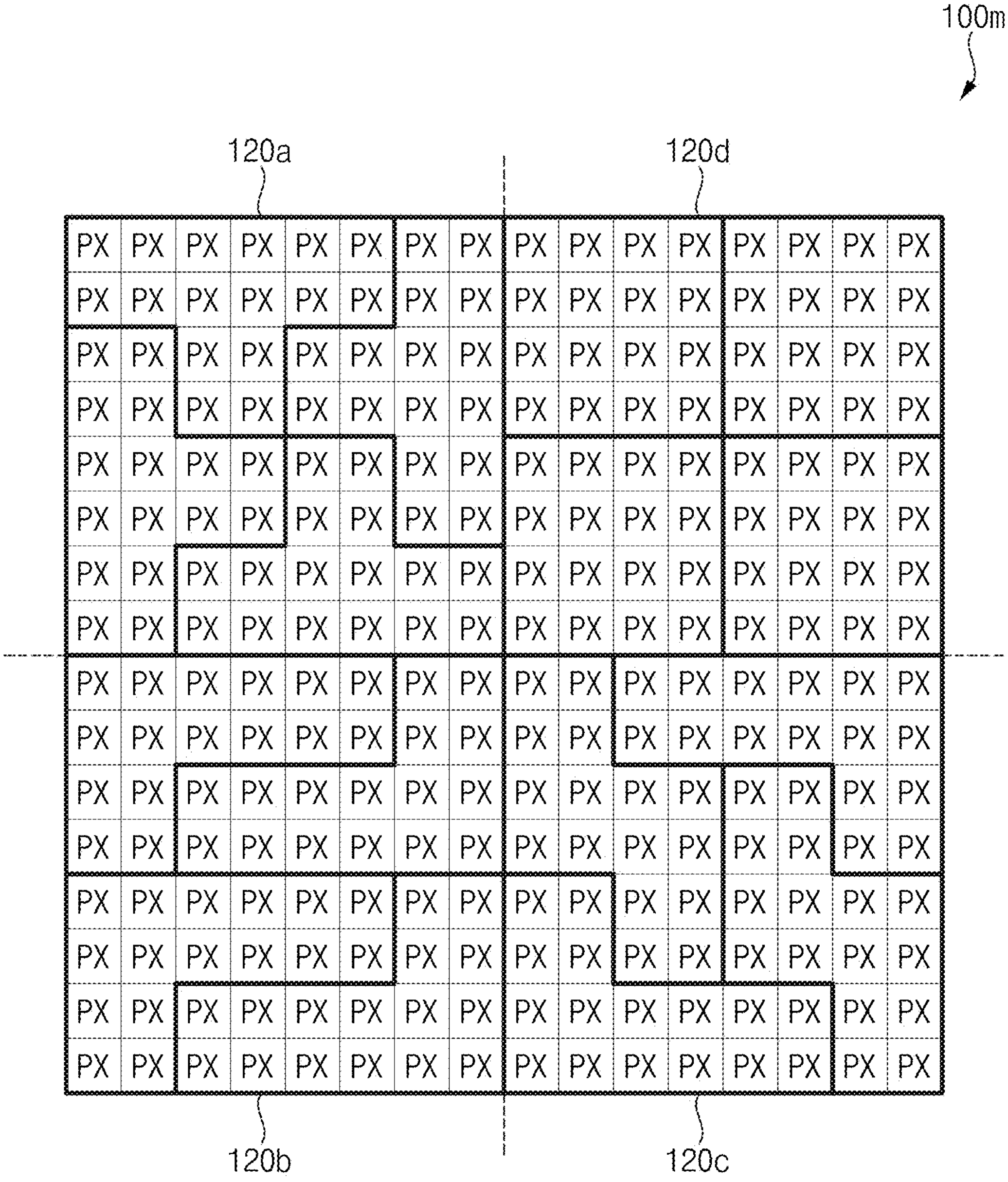
FIG. 24 is a diagram illustrating an example of a display panel of the display device of FIG. 1.

FIG. 24 is a diagram illustrating an example of a display panel 100*m* of the display device 1 of FIG. 1.

Referring to FIG. 24, the display panel 100*m* may be divided into a plurality of pixel blocks.

In an embodiment, the display panel 100*m* may be divided into the first pixel block 120*a*, the second pixel block 120*b*, the third pixel block 120*c*, and the fourth pixel block 120*d*. For example, a first area where the afterimage may easily occur may be divided into the first pixel block 120*a*, a second area where the afterimage may easily occur may be divided into the second pixel block 120*b*, a third area where the afterimage may easily occur may be divided into the third pixel block 120*c*, and a fourth area may be divided into the fourth pixel block 120*d*.

When the first pixel block 120*a* is divided into the first sub-pixel block 110*a*, the second sub-pixel block 110*b*, the third sub-pixel block 110*c*, and the fourth sub-pixel block 110*d*, the length of the adjacent boundary of each of the first sub-pixel block 110*a*, the second sub-pixel block 110*b*, the third sub-pixel block 110*c*, and the fourth sub-pixel block 110*d* may be equal to the length of two pixels PX.

When the second pixel block 120*b* is divided into the fifth sub-pixel blocks 111*a* and the eighth sub-pixel blocks 111*b*, the length of the adjacent boundary of each of the fifth sub-pixel blocks 111*a* and the eighth sub-pixel blocks 111*b* may be equal to the length of at least two pixels PX. The length of the adjacent boundary of each of the fifth sub-pixel blocks 111*a* and the eight sub-pixel blocks 111*b* may be equal to a length of up to four pixels PX.

When the third pixel block 120*c* is divided into the fifth sub-pixel block 111*a*, the sixth sub-pixel blocks 112, and the eighth sub-pixel block 111*b*, the length of the adjacent boundary of each of the fifth sub-pixel block 111*a*, the sixth sub-pixel blocks 112, and the eighth sub-pixel block 111*b* may be equal to the length of at least two pixels PX. The length of the adjacent boundary of each of the fifth sub-pixel block 111*a*, the sixth sub-pixel blocks 112, and the eight sub-pixel block 111*b* may be equal to a length of up to four pixels PX.

In other words, the length of the boundary of each of the sub-pixel blocks may be shorter than or equal to the length of the comparative boundary. Accordingly, even if a difference of each of the sub-pixels blocks occurs, the length of the boundary may be decreased, so that the afterimage may not be visible. When the first area of the display panel 100*m* is divided into the first pixel block 120*a*, the second area of the display panel 100*m* is divided into the second pixel block 120*b*, and the third area of the display panel 100*m* is divided into the third pixel block 120*c*, the afterimage may not be visible in the first area, the second area, and the third area of the display panel 100*m*.

The number of the pixels PX included in the first sub-pixel block 110*a*, the second sub-pixel block 110*b*, the third sub-pixel block 110*c*, the fourth sub-pixel block 110*d*, the fifth sub-pixel block 111*a*, the sixth sub-pixel block 112, and the eighth sub-pixel block 111*b* may be equal to the number of pixels included in the comparative sub-pixel blocks. For example, each of the comparative sub-pixel blocks may include sixteen pixels, and each of the first sub-pixel block 110*a*, the second sub-pixel block 110*b*, the third sub-pixel block 110*c*, the fourth sub-pixel block 110*d*, the fifth sub-pixel block 111*a*, the sixth sub-pixel block 112, and the eighth sub-pixel block 111*b* may include sixteen pixels PX. In other words, the memory capacity may be decreased compared to that of the case of reducing the number of the pixels PX included in the first sub-pixel block 110*a*, the second sub-pixel block 110*b*, the third sub-pixel block 110*c*, the fourth sub-pixel block 110*d*, the fifth sub-pixel block 111*a*, the sixth sub-pixel block 112, and the eighth sub-pixel block 111*b*, and reducing the length of the boundary of each of the first sub-pixel block 110*a*, the second sub-pixel block 110*b*, the third sub-pixel block 110*c*, the fourth sub-pixel block 110*d*, the fifth sub-pixel block 111*a*, the sixth sub-pixel block 112, and the eighth sub-pixel block 111*b*. When the memory capacity decreases, the power consumption of the display device 1 may be decreased.

Figure 25:
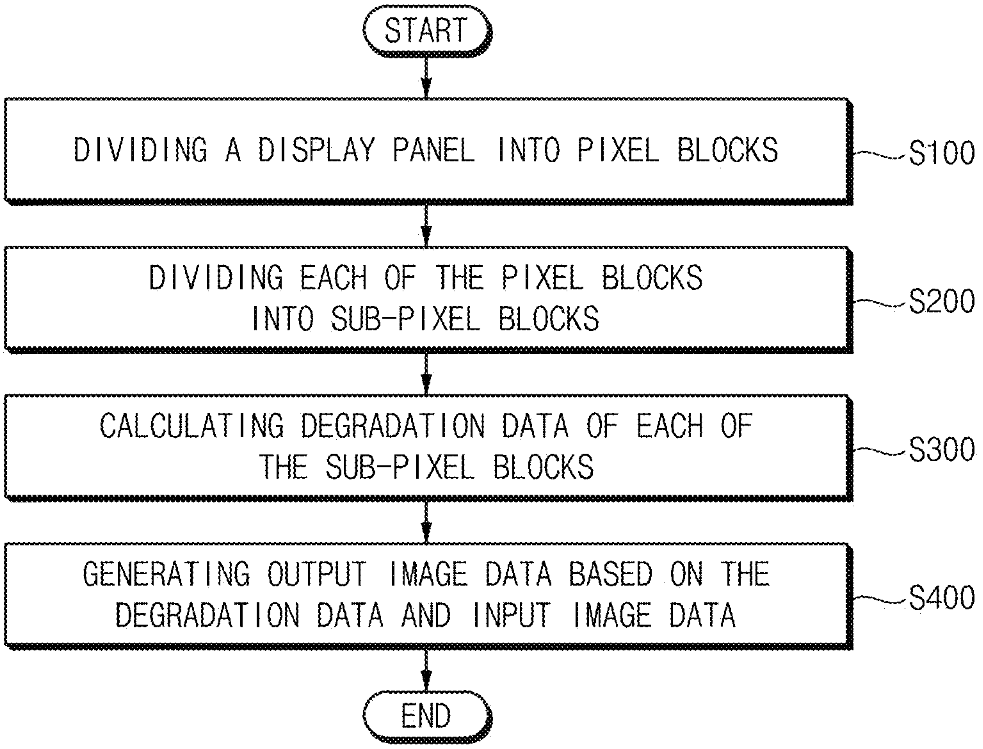
FIG. 25 is a flowchart diagram illustrating a method of operating the display device of FIG. 1.

FIG. 25 is a flowchart diagram illustrating a method of operating the display device 1 of FIG. 1.

Referring to FIG. 25, the method of operating the display device 1 may include dividing a display panel into pixel blocks (S100), dividing each of the pixel blocks into sub-pixel blocks (S200), calculating degradation data of each of the sub-pixel blocks (S300), and generating output image data based on the degradation data and input image data (S400).

In the dividing of each of the pixel blocks into sub-pixel blocks (S200), at least one pixel block among the pixel blocks may be divided into the pixel blocks having the different shapes from each other.

For example, the first pixel block 120*a* may be divided into the first sub-pixel block 110*a*, the second sub-pixel block 110*b*, the third sub-pixel block 110*c*, and the fourth sub-pixel block 110*d*. The display panel 100 may be divided into the first pixel block 120*a*.

For example, the fourth pixel block 120*d* may be divided into four of the seventh sub-pixel blocks 113. The display panel 100 may be divided into the first pixel block 120*a* and the fourth pixel block 120*d*.

The method of operating the display device 1 may be operated by the driving controller 200 of the display device 1.

According to the method of operating the display device 1, The display device may determine the shape of each of the sub-pixel blocks to be non-rectangular. When the shape of each of the sub-pixel blocks is not rectangular, the length of the boundaries between adjacent sub-pixel blocks among the sub-pixel blocks may be decreased. When a luminance difference occurs between the adjacent sub-pixel blocks among the sub-pixel blocks, the length of the boundaries may be decreased, and an area where the luminance difference may be visible may be decreased. The area where the luminance difference may be visible may be decreased, so that the afterimage may not be visible.

In addition, the shape of each of the sub-pixel blocks may be changed, but the number of the pixels included in each of the sub-pixel blocks may be the same as that in a comparative display device. The memory capacity for storing the degradation data of each of the sub-pixel blocks may be the same as that in the comparative display device. In other words, the number of the pixels included in the sub-pixel blocks may be decreased, so that the memory capacity may be decreased compared to that of reducing the length of the boundaries of the sub-pixel blocks. When the memory capacity decreases, the power consumption of the display device may be decreased.

Figure 26:
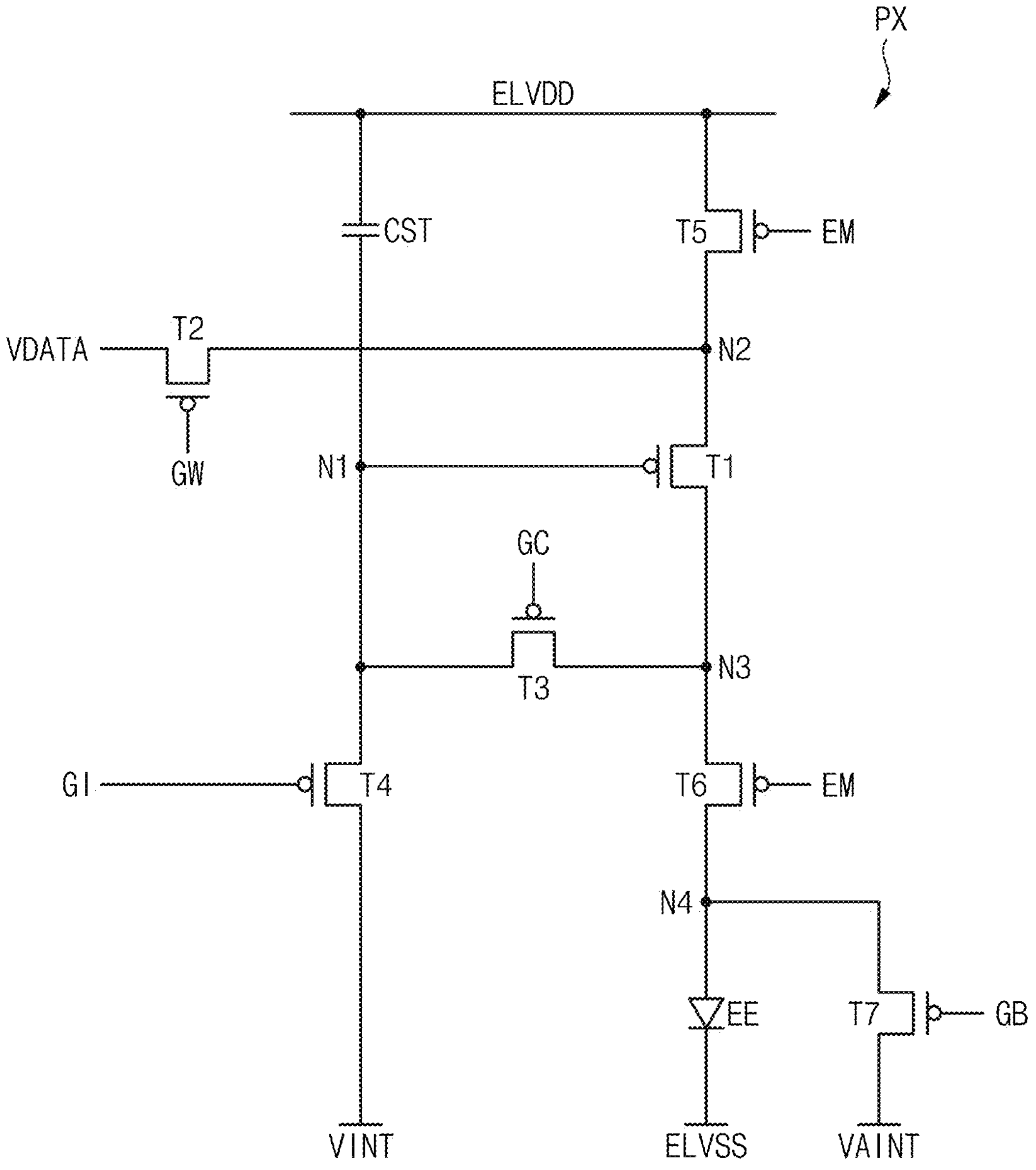
FIG. 26 is a circuit diagram illustrating an example of a pixel included in a display panel of the display device of FIG. 1.

FIG. 26 is a circuit diagram illustrating an example of a pixel PX included in the display panel 100 of the display device 1 of FIG. 1.

Referring to FIG. 26, the pixel PX may include a first transistor T1, a second transistor T2, a third transistor T3, a fourth transistor T4, a fifth transistor T5, a sixth transistor T6, a seventh transistor T7, a storage capacitor CST, and a light emitting element EE.

The first transistor T1 may include a control electrode connected to a first node N1, a first electrode connected to a second node N2, and a second electrode connected to a third node N3. The first transistor T1 may generate a driving current based on a voltage of the first node N1. For example, the first transistor T1 may be referred to as a driving transistor.

The second transistor T2 may include a control electrode for receiving a writing gate signal GW, a first electrode for receiving a data voltage VDATA, and a second electrode connected to the second node N2. The second transistor T2 may transmit the data voltage VDATA to the second node N2 in response to the writing gate signal GW. For example, the second transistor T2 may be referred to as a writing transistor.

The third transistor T3 may include a control electrode for receiving a compensation gate signal GC, a first electrode connected to the third node N3, and a second electrode connected to the first node N1. The third transistor T3 may diode-connect the first transistor T1 in response to the compensation gate signal GC. For example, the third transistor may be referred to as a compensation transistor.

The fourth transistor T4 may include a control electrode for receiving an initialization gate signal GI, a first electrode for receiving an initialization voltage VINT, and a second electrode connected to the first node N1. For example, the fourth transistor T4 may be referred to as an initialization transistor.

The fifth transistor T5 may include a control electrode for receiving an emission signal EM, a first electrode for receiving a first power supply voltage ELVDD, and a second electrode connected to the second node N2. The fifth transistor T5 may transmit the first power supply voltage ELVDD to the second node N2 in response to the emission signal EM. For example, the fifth transistor T5 may be referred to as a first emission transistor.

The sixth transistor T6 may include a control electrode for receiving the emission signal EM, a first electrode connected to the third node N3, and a second electrode connected to a fourth node N4. The sixth transistor T6 may connect the third node N3 and the fourth node N4 to each other in response to the emission signal EM. For example, the sixth transistor T6 may be referred to as a second emission transistor.

The seventh transistor T7 may include a control electrode for receiving a bias gate signal GB, a first electrode for receiving a light emitting element initialization voltage VAINT, and a second electrode connected to the fourth node N4. The seventh transistor T7 may transmit the light emitting element initialization voltage VAINT to the fourth node N4 in response to the bias gate signal GB. For example, the light emitting element initialization voltage VAINT may be lower than the second power supply voltage ELVSS. The light emitting element initialization voltage VAINT may be applied to the fourth node N4, so that black characteristics of the pixel PX may be improved.

The storage capacitor CST may include a first electrode for receiving the first power supply voltage ELVDD, and a second electrode connected to the first node N1. The storage capacitor CST may store the voltage of the first node N1.

The light emitting element EE may include a first electrode connected to the fourth node N4, and a second electrode for receiving a second power supply voltage ELVSS. The light emitting element EE may emit light based on the driving current. The second power supply voltage ELVSS may be lower than the first power supply voltage ELVDD.

Figure 27:
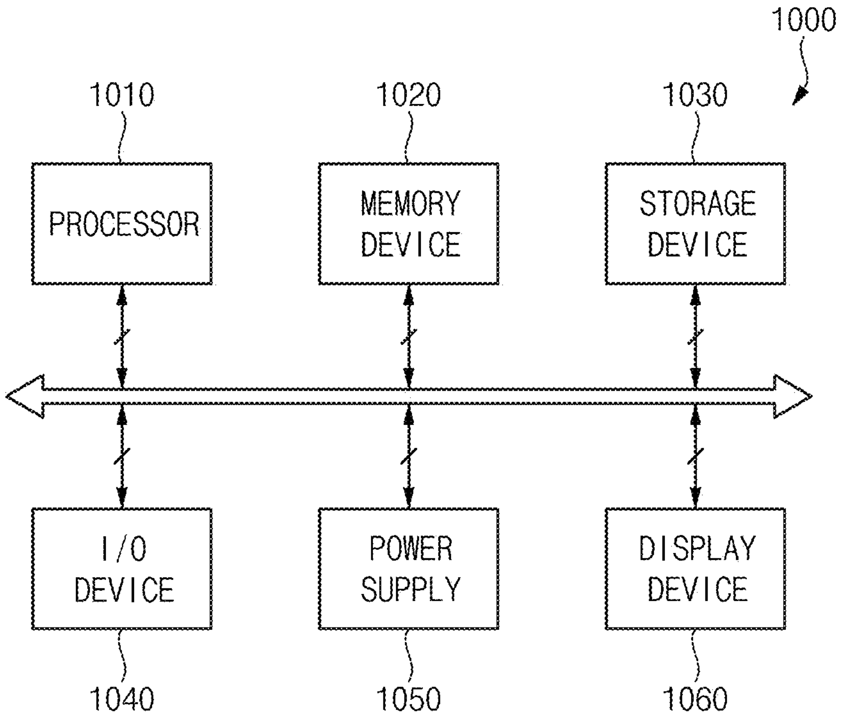
FIG. 27 is a block diagram illustrating an electronic device according to an embodiment of the present disclosure.
Figure 28:
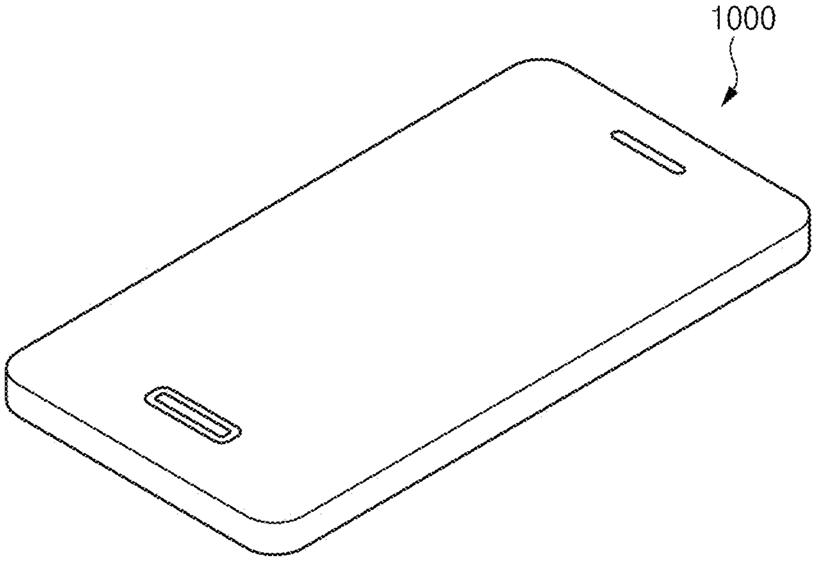
FIG. 28 is a diagram illustrating the electronic device of FIG. 27 implemented as a smart phone.

FIG. 27 is a block diagram illustrating an electronic device 1000 according to an embodiment of the present disclosure. FIG. 28 is a diagram illustrating the electronic device 1000 of FIG. 27 implemented as a smart phone.

Referring to FIGS. 27 and 28, the electronic device 1000 may include a processor 1010, a memory device 1020, a storage device 1030, an input/output (I/O) device 1040, a power supply 1050, and a display device 1060. The display device 1060 may be the display device of FIG. 1. In addition, the electronic device 1000 may further include ports for communicating with a video card, a sound card, a memory card, a universal serial bus (USB) device, another electronic device, and the like.

In an embodiment, as illustrated in FIG. 28, the electronic device 1000 may be implemented as a smart phone. However, the present disclosure is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various suitable computing functions. The processor 1010 may be a microprocessor, a central processing unit (CPU), an application processor (AP), and/or the like. The processor 1010 may be coupled to the other components via an address bus, a control bus, a data bus, and the like. Further, the processor 1010 may be coupled to an extended bus, such as a peripheral component interconnection (PCI) bus.

The processor 1010 may output the input image data IMG and the input control signal CONT to the driving controller 200 of the display device 1 of FIG. 1.

The memory device 1020 may store data for operations of the electronic device 1000. For example, the memory device 1020 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like, and/or at least one volatile memory device, such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, and/or the like.

The I/O device 1040 may include an input device, such as a keyboard, a keypad, a mouse device, a touch-pad, a touch-screen, and/or the like, and an output device, such as a printer, a speaker, and/or the like. In some embodiments, the I/O device 1040 may include the display device 1060.

The power supply 1050 may provide power for the operations of the electronic device 1000.

The display device 1060 may be connected to the other components through buses or other communication links.

When the display device 1060 is the display device 1 of FIG. 1, the display device 1 may divide the display panel 100 into a plurality of pixel blocks. The display device 1 may divide the pixel blocks into a plurality of sub-pixel blocks. The display device 1 may determine the shape of each of the sub-pixel blocks to be non-rectangular. When a luminance difference occurs between adjacent sub-pixel blocks among the sub-pixel blocks, the length of the boundaries may be decreased, and an area where the luminance difference may be visible may be decreased. The area where the luminance difference may be visible may be decreased, so that the afterimage may not be visible.

In addition, the shape of each of the sub-pixel blocks may be changed, but the number of the pixels included in each of the sub-pixel blocks may be the same as that in a comparative display device. The memory capacity for storing the degradation data of each of the sub-pixel blocks may be the same as that in the comparative display device. In other words, the number of the pixels included in the sub-pixel blocks may be decreased, so that the memory capacity may be decreased compared to that of reducing the length of the boundaries of the sub-pixel blocks. When the memory capacity decreases, the power consumption of the display device may be decreased.

Some embodiments of the present disclosure may be applied to any suitable display device and any suitable electronic device. For example, some embodiments of the present disclosure may be applied to a television (TV), a digital TV, a 3D TV, a mobile phone, a smart phone, a tablet computer, a laptop computer, a personal computer (PC), a household electronic device, a personal digital assistant (PDA), a portable multimedia player (PMP), a digital camera, a music player, a portable game console, a navigation device, and the like.

The electronic or electric devices and/or any other relevant devices or components according to embodiments of the present disclosure described herein (e.g., the driving controller, the block determiner, the degradation data accumulator, the degradation compensator, and the like) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:
- a driving controller configured to receive input image data, and generate output image data;
- a data driver configured to generate data voltages based on the output image data; and
- a display panel configured to display an image based on the data voltages,
- wherein the driving controller is further configured to:
  - divide the display panel into pixel blocks;
  - divide each of the pixel blocks into sub-pixel blocks;
  - calculate degradation data of each of the sub-pixel blocks; and
  - generate the output image data based on the degradation data and the input image data, and
- wherein the sub-pixel blocks of a first pixel block of the pixel blocks have different shapes from each other.

2. The display device of claim 1, wherein each of the sub-pixel blocks of the first pixel block has N outlines, where N is an integer greater than or equal to 5, and
- wherein the sub-pixel blocks of the first pixel block are symmetrical to each other.

3. The display device of claim 1, wherein the sub-pixel blocks comprise:
- first sub-pixel blocks, each having N outlines, where N is an integer greater than or equal to 5; and
- second sub-pixel blocks, each having four outlines, and having a same shape as each other, and
- wherein the first sub-pixel blocks are symmetrical to each other.

4. The display device of claim 3, wherein the first pixel block comprises the first sub-pixel blocks, and
- wherein a second pixel block of the pixel blocks comprises the second sub-pixel blocks.

5. The display device of claim 1, wherein the sub-pixel blocks of the first pixel block comprise:
- first sub-pixel blocks, each having N outlines, and having a same shape as each other, where N is an integer greater than or equal to 5; and
- second sub-pixel blocks, each having M outlines, where M is an integer greater than or equal to 5, and
- wherein the second sub-pixel blocks are symmetrical to each other.

6. The display device of claim 1, wherein the sub-pixel blocks comprise:
- first sub-pixel blocks, each having N outlines, and having a same shape as each other, where N is an integer greater than or equal to 5;
- second sub-pixel blocks, each having M outlines, where M is an integer greater than or equal to 5; and
- third sub-pixel blocks, each having four outlines, and having a same shape as each other, and
- wherein the second sub-pixel blocks are symmetrical to each other.

7. The display device of claim 6, wherein the first pixel block comprises the first sub-pixel blocks and the second sub-pixel blocks, and
- wherein a second pixel block of the pixel blocks comprises the third sub-pixel blocks.

8. The display device of claim 1, wherein the sub-pixel blocks comprise:
- first sub-pixel blocks, each having N outlines, where N is an integer greater than or equal to 5; and
- second sub-pixel blocks, each having M outlines, where M is an integer greater than or equal to 5,
- wherein the first sub-pixel blocks are symmetrical to each other, and
- wherein the second sub-pixel blocks are symmetrical to each other.

9. The display device of claim 8, wherein the first pixel block comprises the first sub-pixel blocks, and
- wherein a second pixel block of the pixel blocks comprises the second sub-pixel blocks.

10. The display device of claim 1, wherein the sub-pixel blocks comprise:
- first sub-pixel blocks, each having N outlines, where N is an integer greater than or equal to 5;
- second sub-pixel blocks, each having M outlines, where M is an integer greater than or equal to 5; and
- third sub-pixel blocks, each having four outlines, and having a same shape as each other,
- wherein the first sub-pixel blocks are symmetrical to each other, and
- wherein the second sub-pixel blocks are symmetrical to each other.

11. The display device of claim 10, wherein the first pixel block comprises the first sub-pixel blocks,
- wherein a second pixel block of the pixel blocks comprises the second sub-pixel blocks, and
- wherein a third pixel block of the pixel blocks comprises the third sub-pixel blocks.

12. The display device of claim 1, wherein the sub-pixel blocks comprise:

first sub-pixel blocks, each having N outlines, where N is an integer greater than or equal to 5;

second sub-pixel blocks, each having M outlines, where M is an integer greater than or equal to 5; and third sub-pixel blocks, each having K outlines, and having a same shape as each other, where K is an integer greater than or equal to 5, wherein the first sub-pixel blocks are symmetrical to each other, and wherein the second sub-pixel blocks are symmetrical to each other.

13. The display device of claim 12, wherein the first pixel block comprises the first sub-pixel blocks, and wherein a second pixel block of the pixel blocks comprises the second sub-pixel blocks and the third sub-pixel blocks.

14. The display device of claim 12, wherein the first pixel block comprises the first sub-pixel blocks, wherein a second pixel block of the pixel blocks comprises the second sub-pixel blocks, and wherein a third pixel block of the pixel blocks comprises the second sub-pixel blocks and the third sub-pixel blocks.

15. The display device of claim 1, wherein the sub-pixel blocks comprise:

first sub-pixel blocks, each having N outlines, where N is an integer greater than or equal to 5;

second sub-pixel blocks, each having M outlines, where M is an integer greater than or equal to 5;

third sub-pixel blocks, each having K outlines, and having a same shape as each other, where K is an integer greater than or equal to 5;and fourth sub-pixel blocks, each having four outlines, and having a same shape as each other, and wherein the first sub-pixel blocks are symmetrical to each other, and wherein the second sub-pixel blocks are symmetrical to each other.

16. The display device of claim 15, wherein the first pixel block comprises the first sub-pixel blocks, wherein a second pixel block of the pixel blocks comprises the second sub-pixel blocks and the third sub-pixel blocks, and wherein a third pixel block of the pixel blocks comprises the fourth sub-pixel blocks.

17. The display device of claim 15, wherein the first pixel block comprises the first sub-pixel blocks, wherein a second pixel block of the pixel blocks comprises the second sub-pixel blocks, wherein a third pixel block of the pixel blocks comprises the second sub-pixel blocks and third sub-pixel blocks, and wherein a fourth pixel block of the pixel blocks comprises the fourth sub-pixel blocks.

18. A method of operating a display device, comprising:

dividing a display panel into pixel blocks;

dividing each of the pixel blocks into sub-pixel blocks;

calculating degradation data of each of the sub-pixel blocks; and generating output image data based on the degradation data and input image data, wherein the sub-pixel blocks of a first pixel block of the pixel blocks have different shapes from each other.

19. An electronic device comprising:

a processor configured to generate input image data;

a driving controller configured to receive the input image data, and generate output image data;

a data driver configured to generate data voltages based on the output image data; and a display panel configured to display an image based on the data voltages, wherein the driving controller is further configured to:

divide the display panel into pixel blocks;

divide each of the pixel blocks into sub-pixel blocks;

calculate degradation data of each of the sub-pixel blocks; and generate the output image data based on the degradation data and the input image data, and wherein the sub-pixel blocks of a first pixel block of the pixel blocks have different shapes from each other.

20. The electronic device of claim 19, wherein each of the sub-pixel blocks of the first pixel block has N outlines, where N is an integer greater than or equal to 5, and wherein the sub-pixel blocks of the first pixel block are symmetrical to each other.

* * * * *